United States Patent [19]

Papcun

[11] Patent Number: 5,440,661
[45] Date of Patent: Aug. 8, 1995

[54] TIME SERIES ASSOCIATION LEARNING

[75] Inventor: George J. Papcun, Santa Fe, N. Mex.

[73] Assignee: The United States of America as represented by the United States Department of Energy, Washington, D.C.

[21] Appl. No.: 473,090

[22] Filed: Jan. 31, 1990

[51] Int. Cl.⁶ .............................................. G10L 9/00
[52] U.S. Cl. .................................................... 395/2.41
[58] Field of Search ..................................... 381/41–46, 381/48; 364/513.5; 382/2, 10, 14–16, 30; 395/2.41, 22

[56] References Cited

U.S. PATENT DOCUMENTS

| | | | |
|---|---|---|---|
| 3,383,466 | 5/1968 | Hillix et al. | 381/43 |
| 3,610,831 | 10/1971 | Moshier et al. | 381/41 |
| 4,087,632 | 5/1978 | Hafer | 179/1 SD |
| 4,426,551 | 1/1984 | Komatsu et al. | 381/41 |
| 4,757,541 | 7/1988 | Beadles | 381/43 |
| 4,769,845 | 9/1988 | Nakamura et al. | 381/43 |
| 4,841,575 | 6/1989 | Welsh et al. | 364/513.5 |
| 4,945,494 | 7/1990 | Penz et al. | 382/15 |
| 4,980,917 | 12/1990 | Hutchins | 381/41 |

OTHER PUBLICATIONS

Petajan, "Automatic Lipreading to Enhance Speech Recognition", 1985 IEEE, pp. 40–47.

Lippmann, et al., "Neural–Net Classifiers Useful for Speech Recognition," IEEE 1st International Conference on Neural Networks, Jun. 21–24, 1987 pp. IV–41-7–IV425.

K. Shirai et al., "Phrase Speech Recognition of Large Vocabulary Using Feature in Articulatory Domain," Proceedings IEEE International Conference on Acoustics, Speech, and Signal Processing, vol. 2, pp. 26.9.1–26.9.4 (San Diego, Calif. 1984).

S. Ishizaki, "Vowel Discrimination by Use of Articulatory Model," Proceedings of the Fourth International Joint Conference on Pattern Recognition, pp. 1050–1052 (Kyoto, Japan 1978).

J. L. Elman et al., "Learning the Hidden Structure of Speech," 83 J. Acoust. Soc. Am. No. 4, pp. 1615–1626 (Apr. 1988).

C. P. Browman et al., "Towards an Articulatory Phonology," 3 Phonology Yearbook, pp. 219–252 (1986).

D. E. Rumelhart et al., 1 Parallel Distributed Processing, Chapter 8, "Learning Internal Representation by Error Propagation," pp. 318–362, The MIT Press, Cambridge Massachusetts (1986).

*Primary Examiner*—Allen R. MacDonald
*Assistant Examiner*—Michelle Doerrler
*Attorney, Agent, or Firm*—Ray G. Wilson; William A. Eklund; William R. Moser

[57] ABSTRACT

An acoustic input is recognized from inferred articulatory movements output by a learned relationship between training acoustic waveforms and articulatory movements. The inferred movements are compared with template patterns prepared from training movements when the relationship was learned to regenerate an acoustic recognition. In a preferred embodiment, the acoustic articulatory relationships are learned by a neural network. Subsequent input acoustic patterns then generate the inferred articulatory movements for use with the templates. Articulatory movement data may be supplemented with characteristic acoustic information, e.g. relative power and high frequency data, to improve template recognition.

1 Claim, 7 Drawing Sheets

TIME SERIES ASSOCIATION LEARNING

BACKGROUND OF THE INVENTION

This invention generally relates to machine-based speech and speaker recognition and, more particularly, to machine-based speech recognition using a learned relationship between acoustic and articulatory parameters. This invention is the result of a contract with the Department of Energy (Contract No. W-7405-ENG-36).

In conventional speech recognition, input acoustic waveforms are obtained and quantized for comparison with stored acoustic waveforms with correlative dictionary data. This approach requires substantial computer memory and requires that the speech patterns of the speaker be sufficiently similar to the stored patterns that a pattern match can be obtained. However, it will be appreciated that speech acoustics are affected by the speaking rate, linquistic stress, emphasis, intensity, and emotions. Further, in fluent speech, the speakers normally modify speech sounds by adding or deleting sounds and by assimilating sounds adjacent to each other.

U.S. Pat. No. 4,769,845 "Method of Recognizing Speech Using a Lip Image," issued Sep. 6, 1988, to Nakamura, teaches speech recognition using a computer with a relatively small memory capacity where a recognition template is formed to include at least lip pattern data. Lip pattern data are initially obtained from external sensor equipment and are collated with stored word templates. However, speech recognition then requires that an external device, such as a TV camera, also ascertain lip pattern data from the speaker whose speech is to be recognized.

It is hypothesized in J. L. Elman et al., "Learning the Hidden Structure of Speech," 83 J Acoust. Soc. Am., 4, pp. 1615-1626 (April 1988), that inappropriate features have been selected as units for recognizing and representing speech. A backpropagation neural network learning procedure is applied to develop a relationship between input/output pattern pairs using only a single input time series. The network developed rich internal representations that included hidden units that corresponded to traditional distinctions as vowels and consonants. However, only abstract relationships were developed since only acoustic tokens were input.

It would be desirable to provide a representation of a speech signal that is relatively invariant under variations in speech rate, stress, and phonetic environment. It would also be desirable to train a system, e.g., an artificial neural network, to recognize speech independent of the speaker. These and other aspects of speech recognition are addressed by the present invention wherein a relationship is learned between an acoustic signal and articulatory mechanisms which generate it. The articulatory representation is then used to recognize speech by others based solely on acoustic inputs.

Accordingly, it is an object of the present invention to provide speech recognition under variations in speech rate, stress, and phonetic environment.

It is another object of the present invention to provide a learned relationship between speech acoustics and articulatory mechanisms.

One other object of the present invention is to obtain speech recognition from learned articulatory gestures without gestural input.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention may comprise a method for recognizing an acoustic input. A relationship is learned between a training acoustic input and a correlative articulatory parameter input. The learning is preferably done in a neural network. A set of relational templates is formed corresponding to the correlative articulatory parameter input. A digital signal functionally related to the acoustic input is now input to the learned relationship for outputting inferred articulatory parameter sets. Each inferred articulatory parameter set is compared with the relational templates to select one of the relational templates which is congruent with the inferred articulatory parameter set within preselected limits. Once the comparison is obtained a signal is output that is functionally related to the selected one of the relational templates.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE DRAWINGS

Figure 1:
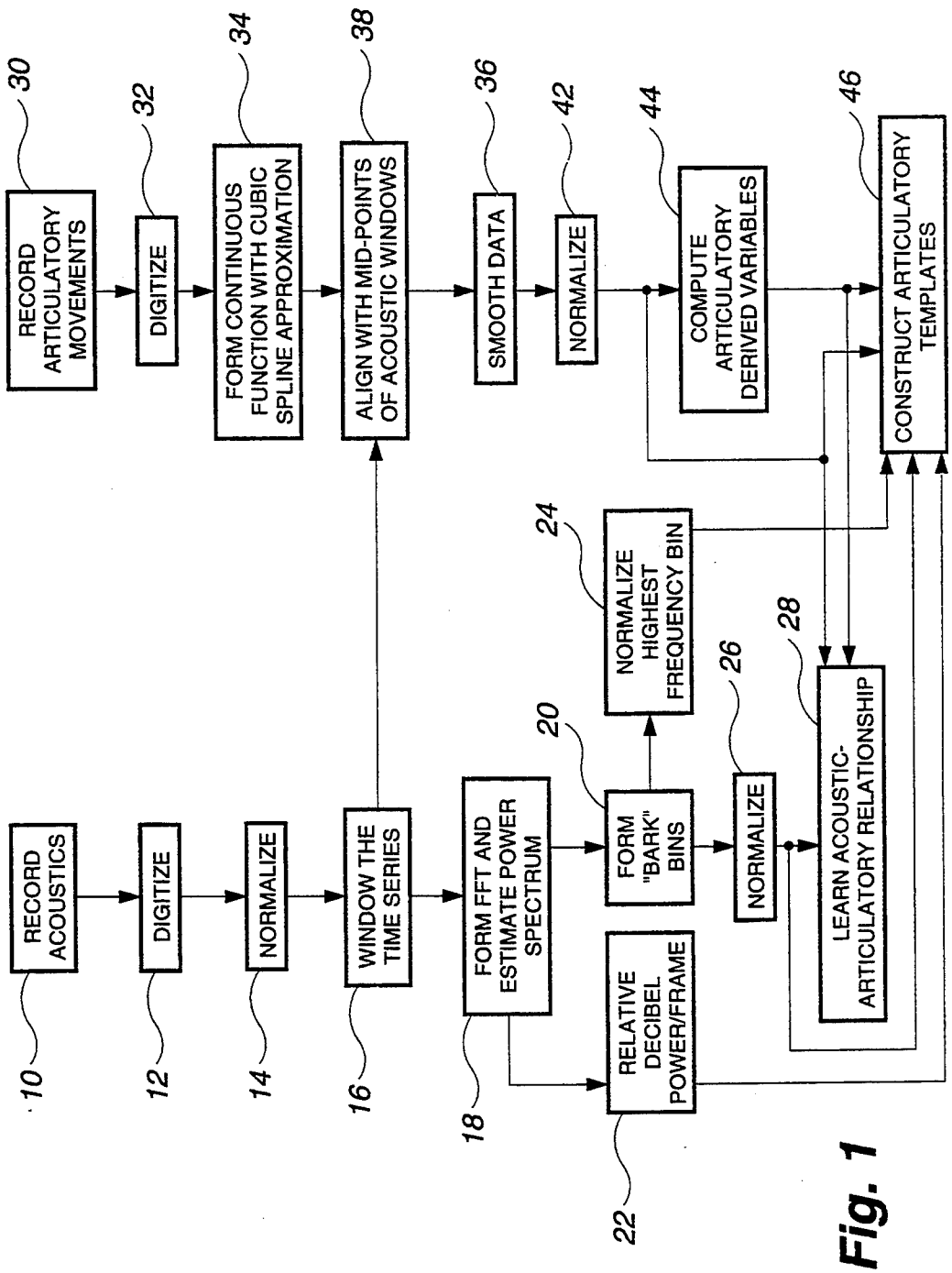
FIG. 1 is a computer program flow chart showing the relationship between the input programs during a learning phase.

The training phase of the speech recognition process of the present invention is shown in FIG. 1. Speech sounds are sampled, spectrally analyzed, quantized into psychoacoustically appropriate frequency resolution, and normalized with respect to overall loudness and spectral slope. Articulatory movements are also obtained and temporally correlated with the acoustic data to generate a set of articulatory parameters. The acoustic and articulatory data are then input to a learning network to develop a learned relationship between the two correlated time series.

Figure 3:
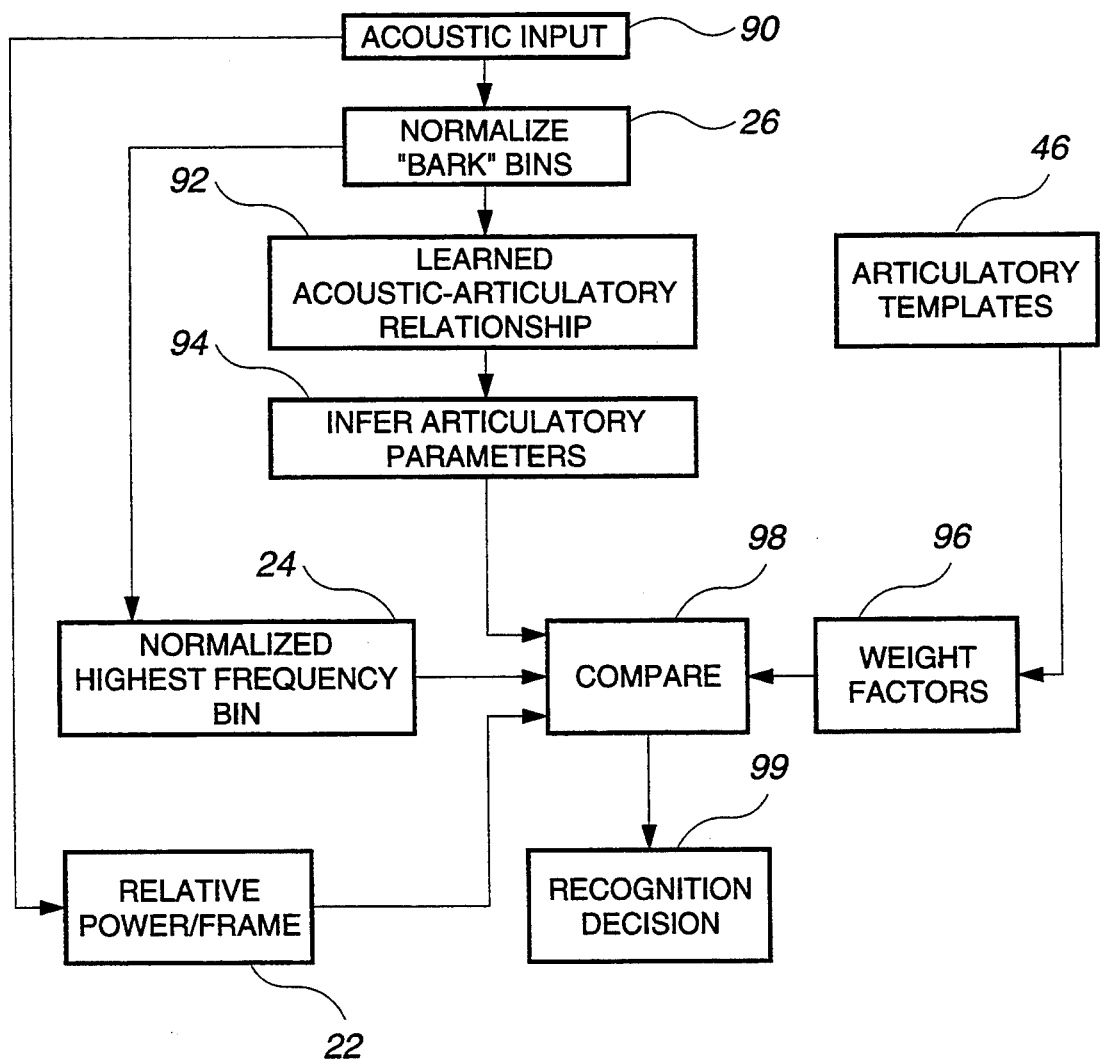
FIG. 3 is a computer program flow chart showing the relationship between processing routines during an application phase of the present invention.

The application phase of the process is depicted in FIG. 3. Acoustic speech sounds are inputted to the trained network, and the learned relationship infers the articulatory movements that must have been used to create the input acoustic sounds. Rather than seeking an overall match for a given utterance, the network analyzes the acoustics to determine information about the articulatory movements underlying the sounds. Thus, it attends only to those aspects of the signal that are relevant to ascertaining the movements.

Referring again to FIG. 1, there is shown a processing flow diagram for teaching a relationship between speech acoustics and concomitant articulatory movements which produce the speech acoustics. In a preferred embodiment discussed herein a neural network learns a relationship between the speech acoustics and articulatory movements, but other learning systems and process, e.g., function approximation, might be used. Thus, the acoustic signals of speech are recorded 10 together with the concomitant articulatory movements 30. The acoustics of speech can either be recorded digitally or with a common tape recorder. The articulatory movements, by contrast, must be recorded with special apparatus. An x-ray microbeam apparatus may be used to collect the articulatory data, but other methods, such as ordinary x-rays or ultrasound reflection, might be used. The acoustic data is then digitized 12 for further processing, e.g., 12 bytes of amplitude resolution at 10K samples per second were taken. As shown in Table A, the articulatory movements are also digitized at a predetermined sampling rate.

TABLE A

| Articulator | Sampling Rate |
| --- | --- |
| lower lip | 90 samples per second |
| upper lip | 45 samples per second |
| tongue tip | 180 samples per second |
| tongue body | 90 samples per second |
| tongue dorsum | 90 samples per second |

The above articulators were initially selected for use, but other articulators could be used either in place of, or in addition to, these articulators.

The acoustic time series is then analyzed. The acoustic time series is normalized 14 to a zero mean in order to remove any direct current bias that is introduced by the recording apparatus or subsequent processing. The normalized time series 14 is windowed 16 with overlapping Welch windows, where each window has a 6.4 ms duration and has a 50 percent overlap with adjacent windows. Spectral transformation and power estimation 18 are performed by means of a fast Fourier transformation and power spectral estimation algorithms.

Once the power spectrum is estimated 18, a "bark" analysis 20 is obtained. "Bark" analysis 20 divides the power spectral estimate into bins that approximate the frequency resolution of human hearing. This processing step is used to reduce the amount of data which must be processed without losing information that is necessary for the understanding of speech. The relative decibel power per frame of the speech signal is computed for each window frame by assigning the highest energy frame a value of one, the lowest frame a value of zero, and every other frame a value proportional to its relationship therebetween. The relative decibel power per frame computation 22 is stored for subsequent use. The energy in the highest frequency bark bin is also linearly normalized 24 to a range between zero and one to further characterize the acoustic sound. Finally, the bark bin values are normalized 26 so that the sum of the energy in all of the frequency bins within each time window is equal to its relative power with respect to the other time windows and so that each bark bin has a value proportional to its percentage of the energy in that time window.

Referring now to the articulatory movement analysis, the digitized articulatory data 32 must be temporally aligned with the acoustic data. Articulatory data 32 is first approximated with a cubic spline algorithm 34 to form a relatively continuous function. The articulatory data from the continuous function 34 is now aligned 38 at the mid-points of the acoustic time series windows 16. The aligned articulatory data 38 are smoothed 36 to remove artifacts in the way the data was sampled, or from other sources of noise, and normalized 42 to be compatible with the learning system. This is done by setting the smallest value for a given articulatory movement to a value of 0.1, and the largest value to 0.9, with values in-between set to values proportional to their positions in the range between 0.1 and 0.9, while preserving the relation between the x and y values for a given articulator. In accordance with the present invention, the normalized articulatory movements are then used to compute two articulatory derived variables, i.e., lip aperture and tongue velocity. Lip aperture is computed as the Euclidian distance from the upper lip to the lower lip. Tongue velocity is a conventional distance/time representation of the tongue tip.

Figure 6:
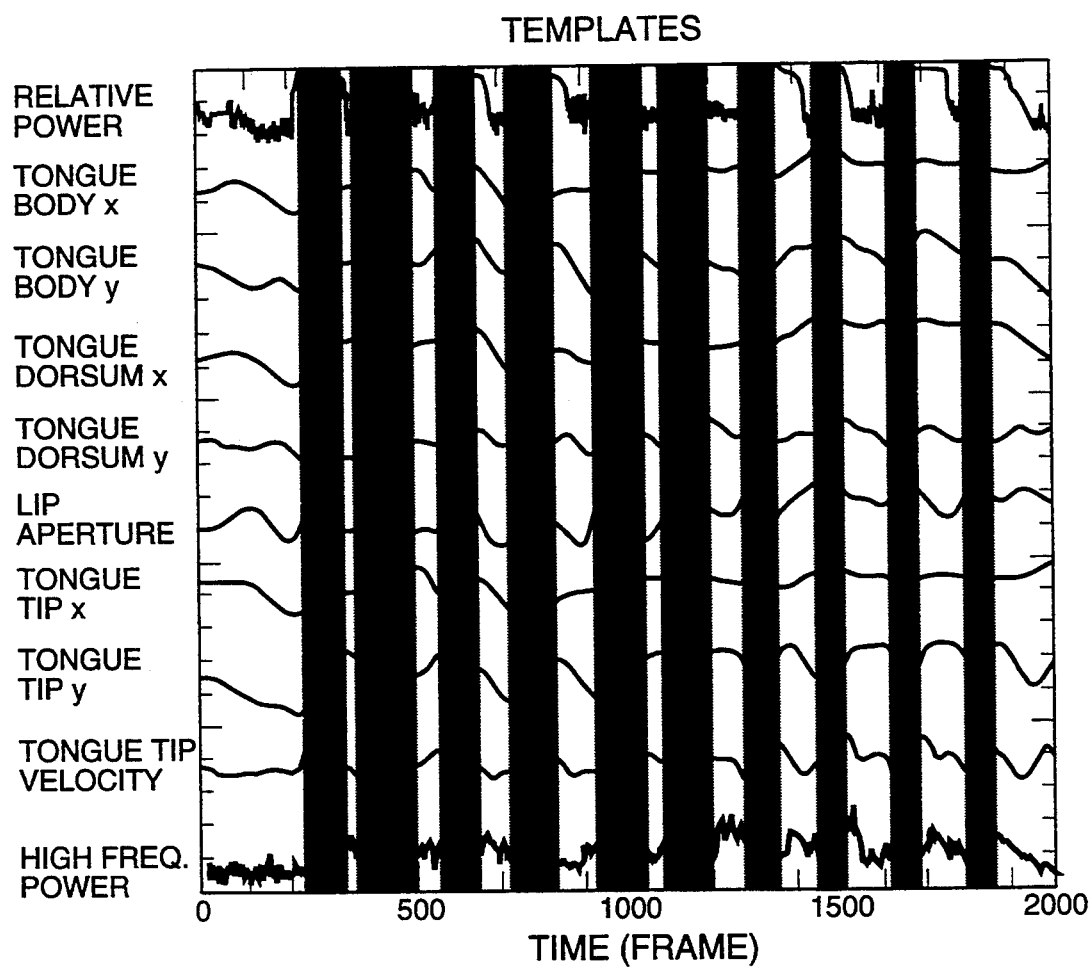
FIG. 6 depicts input data for forming relational templates.

The normalized articulatory movements 42 and the derived articulatory variables 44 are used to construct electronic templates for each of the utterances the system is to recognize, as more particularly discussed with FIG. 6. The templates are constructed based on articulatory parameters 42, 44 with the addition of relative power information 22 and high frequency information 24. The acoustical input 10 is analyzed to determine the segment which best represents the selected speech token. The corresponding acoustic parameters 22, 24 and articulatory parameters 42, 44 are then selected to form template 46. This selection may be done manually or electronically. As hereinafter discussed, certain aspects of the templates may be weighted in such a manner as to emphasize parameters that will contribute to distinguishing the utterances. If the device is intended to be used for speaker recognition the weights may serve to better distinguish the speakers and the templates are then derived from utterances spoken by the selected speaker.

Figure 2:
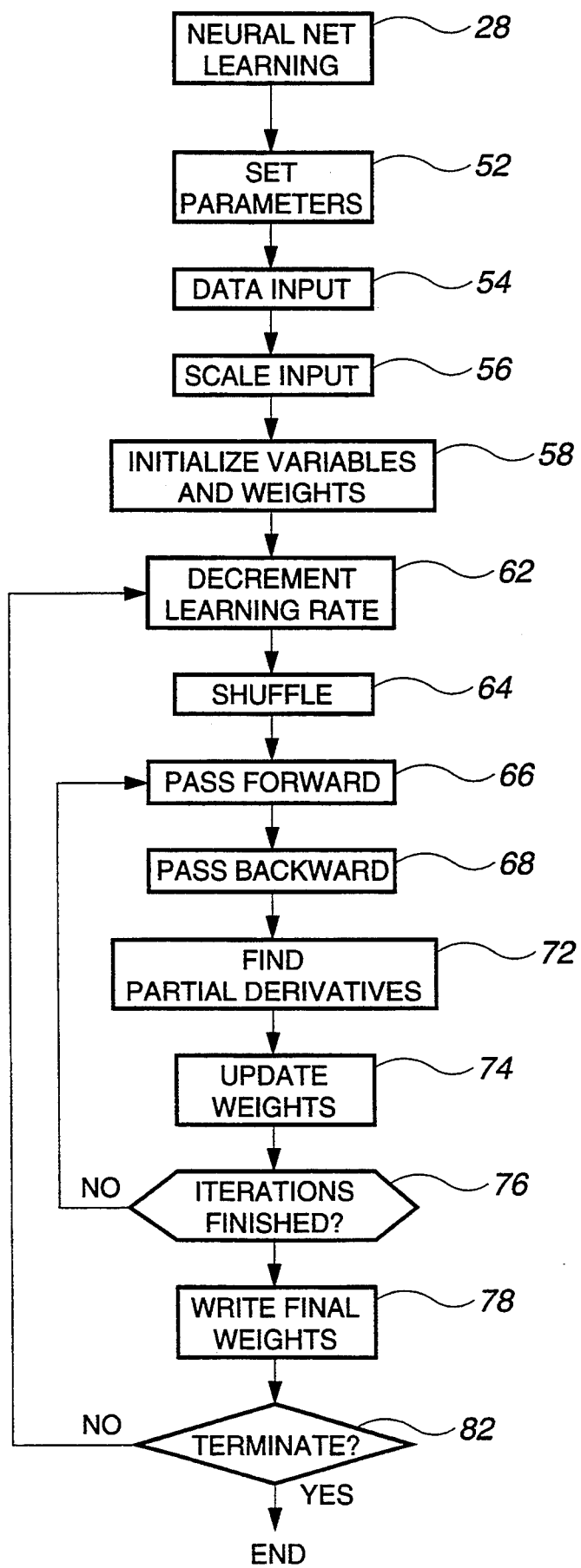
FIG. 2 is a computer program flow chart showing a neural net learning process.

A learning network, e.g., a neural network, is now trained 28 to learn the relationship between the acoustic data and the associated articulatory data. Normalized acoustic data 26 and normalized articulatory movement 42 and derived variable 44 data are input to the learning network, which learns the relationship between the acoustic data and the articulation data. In one embodiment of the present invention, the learning network is a four layer, feed-forward backpropagation neural network. The program used herein applies a 288 ms input window through the acoustic data, and maps to the articulatory data at the mid-point of the window. A plurality of training speakers may be used to provide a more general learned relationship between the input time series. Neural net learning process 28 is more particularly shown in FIG. 2 and implements the process described in D. E. Rumelhart et al., 1 Parallel Distributed Processing, Chapter 8, "Learning Internal Representations by Error Propagation," The MIT Press, Cambridge, Mass., 1986, incorporated herein by reference. The neural net parameters are set 52 to provide an optimum learned relationship between the input acoustic and articulatory time series. A preferred set of parameters is set out in Table B.

TABLE B

NEURAL NET INITIALIZATION PARAMETERS

| | |
|---|---|
| nd-allowed acoustic data frames | 1966 |
| nb-number of bins/frame | 18 |
| nw-frames in window | 80 |
| nhlayer-hidden layers (1 or 2) | 1 |
| nh1-units in hidden layer 1 | 5 |
| nh2-units in hidden layer 2 | dummy |
| nit-number of iterations | 5000 |
| cr-error convergence criteria | 0.12 |
| lr-learning rate | 0.5 |
| ar-annealing rate | 0.999 |
| mr-momentum | 0.5 |
| whtrng-range for random weights | −0.8, +0.8 |
| epoch-weight update rate (f-after each pattern) | false |
| randwt-whether generate random weight (t-yes) | true |
| pp-context window distance for focus | 0.8 |
| idum-random weight seed | any - integer |
| iseed-ramdom weight seed | any - integer |
| exptrap-value at which squash = 1 or 0 | 1000 |

The normalized acoustic data 26 and the recorded and computed articulatory data 42, 44 (FIG. 1) are input 54 and scaled 56 for processing. Program variables and relational weights are randomly initialized 58 prior to the feed-forward backpropagation learning.

An initial learning rate is set 62 and the learning order for the relationships is randomly shuffled 64. The acoustic data is then passed forward 66 through the network using the initial random weights to derive a first set of inferred articulatory parameters. The inferred articulatory parameters are used to determine the errors with respect to the actual articulatory parameters that were input to the network. The detected error is then passed backward 68 through the network, where the partial derivative of each weight with respect to the overall error is computed 72. Partial derivatives 72 are used to determine the direction of change required for each weight to update 74 the weight values to reduce the overall error in generating a corrected output.

The program determines whether the error correcting iterations are finished 76, based on either the errors being within acceptable limits or a selected number of iterations being tried. The neural net weights are stored 78 and, if acceptable errors were obtained with the stored weights, the learning program is terminated 82. If acceptable errors were not obtained, the program decrements 62 the learning rate parameter and the learning iterations are continued, starting with the stored weights. Once the learning iterations are terminated 82 the learned relational weights are stored for use in an application of the present system.

When the acoustic-articulatory relationships have been learned 28 and the articulatory templates have been constructed 46, the system is ready for speech recognition application. Referring now to FIG. 3, an acoustic input 90 is formed as shown in FIG. 1 (process steps 10, 12, 14, 16, and 18) to output a relative power/frame signal 22 and bark bins which are normalized 26. The primary acoustic input is then passed through the learned acoustic-articulatory relationship 92 in a neural network to infer articulatory parameters 94 from the acoustic data. The inferred articulatory parameters 94, along with the normalized highest frequency bin information 24 and relative power/frame information 22 are inputted for a comparison 98 with the formed articulatory templates 46. Appropriate weight factors 96 may be applied to articulatory templates 46.

A number of methods may be used for comparing the inferred articulation with the templates, e.g., Euclidian distance, cross-correlation, and covariance. The method currently used in the process is based on Euclidian distance. The comparison is made by sliding the templates from each training utterance over the inferred articulatory and measured acoustic parameters of the input speech sequentially at each time step. In the implementation described herein, as each training utterance is slid in sequential steps over the inferred articulatory and measured acoustic parameters of the input speech, a distance is calculated for that template at each step to yield a set of distances for each training utterance template. For each such set of distances, the mean and the standard deviation are calculated.

A recognition decision 99 is then made based on the intended application. As used herein, the decision threshold for each training utterance template is defined to be a distance equal to two standard deviations below the mean of the distances for that template. An extremum finding algorithm is used on the sequence of distance matches to assign a single point of match. Extrema for which the distance between the template and the inferred articulatory and measured acoustic parameters is closer to the origin than two standard deviations from the mean of the distances for that template are recognized as instances of the utterance represented by that template.

Figure 4:
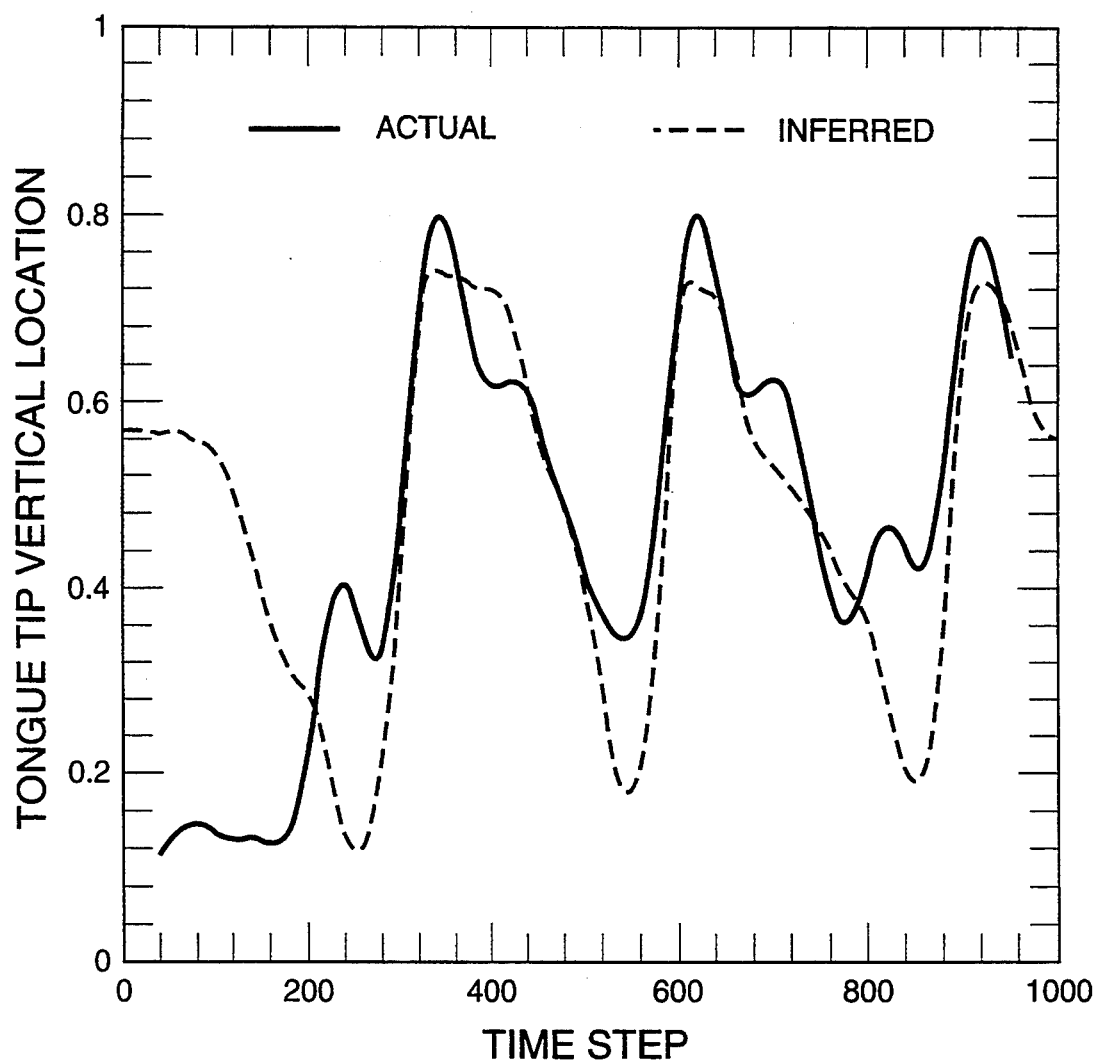
FIG. 4 is a result obtained by training the system with measured and inferred tongue tip vertical motion from a speaker repeating the word "ONE".
Figure 5:
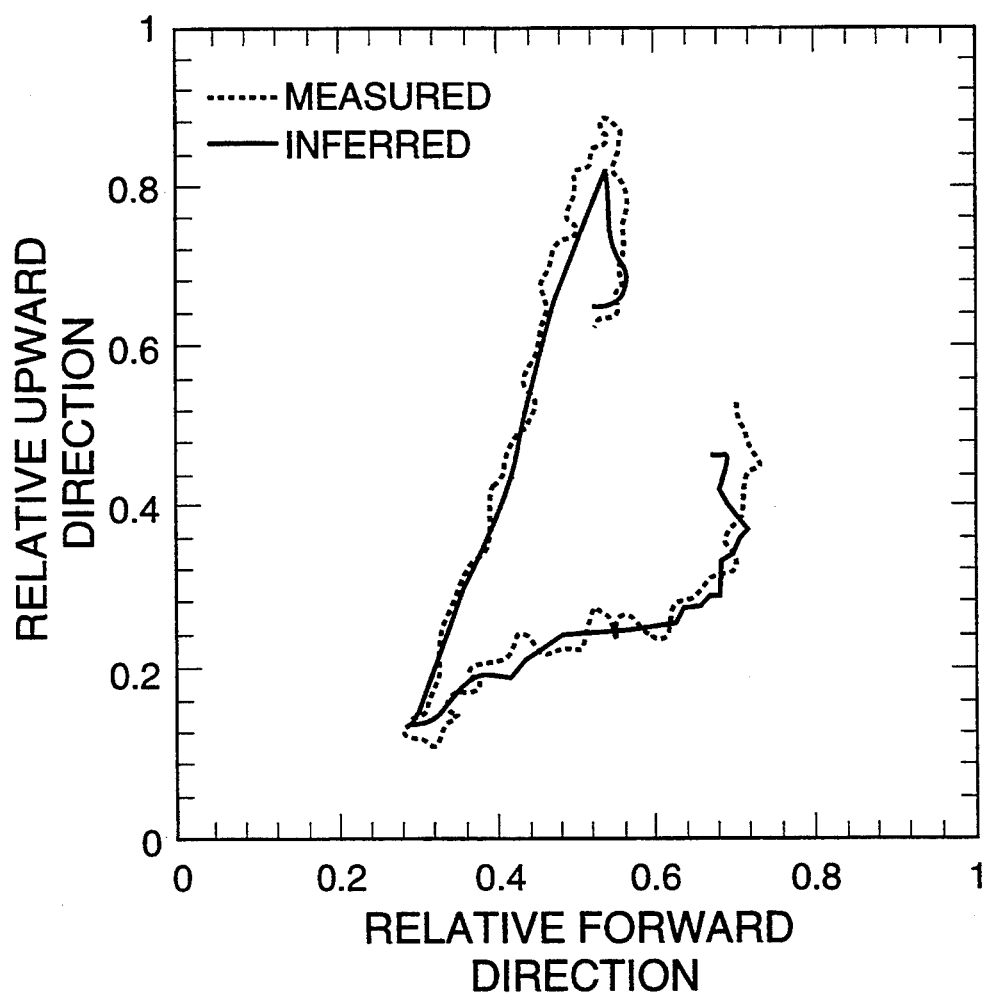
FIG. 5 further indicates the capability of the present system by plotting measured and inferred tongue tip coordinates for a speaker saying the word "ONE".

Referring now to FIG. 4, there is shown a comparison of an actual tongue-tip location measurement along with the tongue-tip movement inferred by a neural network trained with a the spoken number "ONE". The word "ONE" was then spoken twice between time steps 200 and 800 and tongue-tip position was inferred. Actual tongue-tip movement was measured for comparison. The close match between the actual distance and the inferred distance is readily apparent. FIG. 5 further depicts the ability of the trained neural network to infer articulatory parameters from an acoustic input. Normalized x and y coordinates of tongue tip motion are plotted, with the measured data shown by the dotted line and the inferred data shown by the plain line. The particular parameter set was for the word "ONE".

Figure 7:
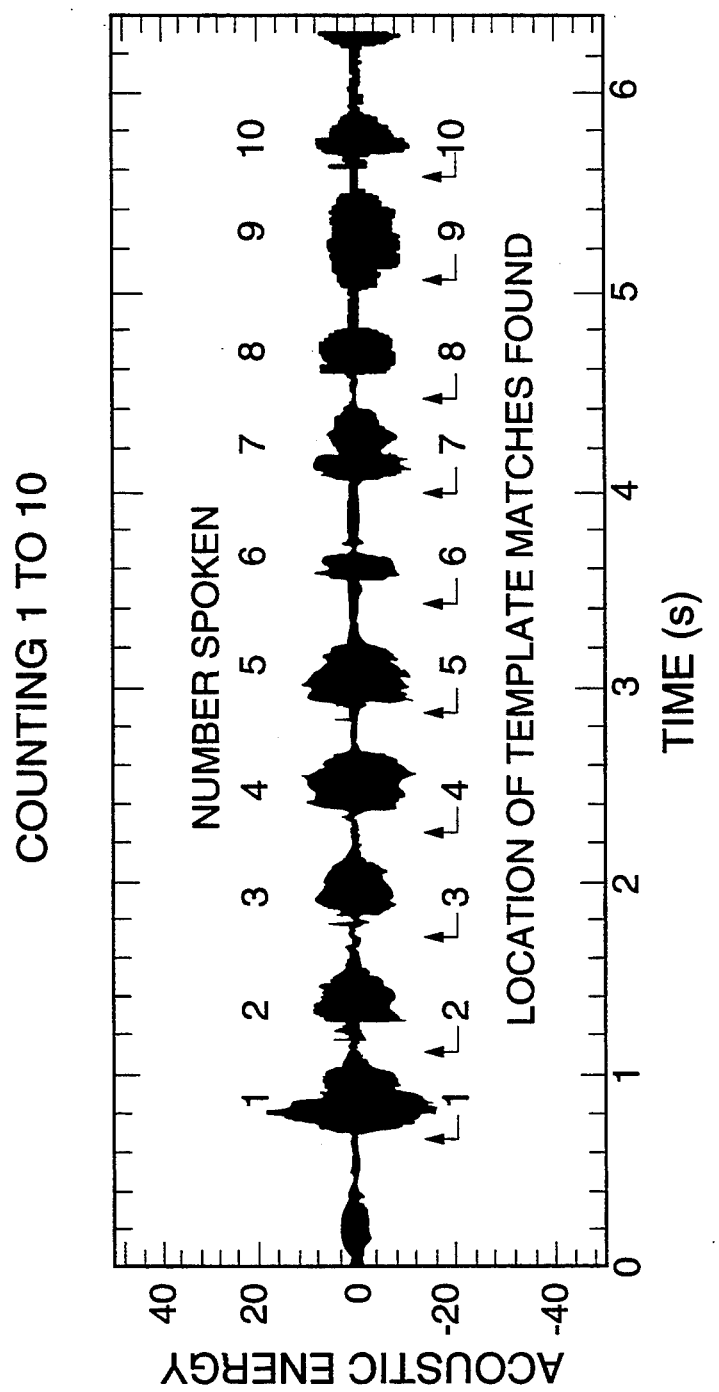
FIG. 7 graphically illustrates speech recognition obtained for the numbers "ONE" through "TEN".

In accordance with the present invention, a neural network was trained on the spoken numbers "ONE through "TEN" and appropriate articulatory templates were constructed. Referring now to FIG. 6 there is shown a set of the acoustic parameters (relative power 22 and high frequency power 24) and articulatory parameters (normalized measured articulatory movement 42 and derived articulatory variables 44) as shown in FIG. 1 for template construction. The words "ONE" through "TEN" corresponding to the inputs are shown at the top of FIG. 6. The parameter regions selected to form a template for each word are shaded on FIG. 6. It can be seen that each template parameter set includes features which are distinctive for that word and is formed over a set of window frames which define a parameter set distinguishable from other templates. In order to enhance the speech recognition, the various template parameters may be weighted, as shown in Table C, for the speech recognition shown in FIG. 7.

TABLE C

| Template | rlp | tbx | tby | tdx | tdy | la | ttx | tty | ttydn | hl9 |
|---|---|---|---|---|---|---|---|---|---|---|
| ONE | .5 | 0 | 0 | 0 | 0 | 1.0 | 0 | 1.0 | 1.0 | 1.0 |
| TWO | .5 | .5 | .5 | 0 | 0 | .5 | 0 | .5 | 0 | .5 |
| THREE | 1.0 | .5 | .5 | .5 | 0 | 0 | .5 | 0 | 0 | 0 |
| FOUR | .5 | 0 | .5 | 0 | .5 | .5 | 0 | 0 | 0 | 0 |
| FIVE | .5 | 0 | 1.0 | 1.0 | 1.0 | 1.0 | 1.0 | 0 | 0 | 0 |
| SIX | .5 | 0 | .5 | 0 | .5 | 0 | 0 | .5 | .5 | .5 |
| SEVEN | .5 | 0 | 0 | 0 | 0 | .5 | .5 | .5 | 0 | .5 |
| EIGHT | .5 | 0 | .5 | 0 | 0 | 0 | .5 | .5 | 0 | 0 |
| NINE | .5 | .5 | .5 | 0 | 0 | 0 | .5 | .5 | 0 | 0 |
| TEN | 1.0 | 0 | 0 | .5 | .5 | 0 | 0 | .5 | 0 | .5 |

Key to column headings:
rlp = relative overall power
tbx = tongue blade horizontal position
tby = tongue blade vertical position
tdx = tongue dorsum horizontal position
tdy = tongue dorsum vertical position
la = lip aperture
ttx = tongue tip horizontal position
tty = tongue tip vertical position
ttydn = differenced tongue tip vertical position
hl9 = normalized high frequency power Subsequently another speaker spoke the numbers "ONE" through "TEN" and the system uniquely recognized each of the spoken words. Table D shows for each template the z-score at the extremum of best match with the speech sample shown in FIG. 7, the position at which the match occurred and the word that was actually spoken at that point. Table E shows the second-closest matches with the speech sample shown in FIG. 7 and the positions at which the second-closest matches occurred. None of these matches exceeded the threshold z-score of −2.0.

TABLE D

BEST MATCH

| Word spoken | Z-score | Position (seconds) | Template |
|---|---|---|---|
| "one" | −2.49 | 0.06 | ONE |
| "two" | −2.30 | 1.14 | TWO |
| "three" | −2.15 | 1.71 | THREE |
| "four" | −2.21 | 2.23 | FOUR |
| "five" | −2.25 | 2.83 | FIVE |
| "six" | −2.29 | 3.42 | SIX |
| "seven" | −2.20 | 3.96 | SEVEN |
| "eight" | −2.25 | 4.53 | EIGHT |
| "nine" | −2.36 | 5.04 | NINE |
| "ten" | −2.17 | 5.61 | TEN |

TABLE E

SECOND BEST MATCH

| Word spoken | Z-score | Position (seconds) | Template |
|---|---|---|---|
| "one" | −1.88 | 2.84 | FIVE |
| "two" | −1.55 | 0.68 | ONE |
| "three" | −1.60 | 1.13 | TWO |
| "four" | −1.84 | 3.94 | SEVEN |
| "five" | −1.84 | 5.05 | NINE |
| "six" | −1.30 | 4.53 | EIGHT |
| "seven" | −1.93 | 5.59 | TEN |
| "eight" | −1.59 | 3.48 | SIX |
| "nine" | −1.83 | 2.89 | FIVE |
| "ten" | −1.75 | 1.18 | TWO |

The learned acoustic/articulatory relationship may be used in a variety of acoustic-related tasks. For example, speaker recognition might be obtained where the system is trained to recognize a particular acoustic/articulatory relationship. Further, the articulatory representation requires only a low bandwidth to transmit all of the information in the representation. Thus, the low bandwidth articulatory representation can be transmitted directly for speech reconstruction at the receiving end. The low bandwidth signal can be securely encrypted.

It will be appreciated that the process hereinabove described has application to any related time series signals, i.e., mechanical time series, acoustical time series, electromagnetic time series, etc. Then, a secondary characteristic can be inferred from a primary characteristic input, the inferred characteristic can then be processed, and the primary characteristic reconstructed. Such potential applications will occur when the secondary characteristic can be more easily handled than a primary characteristic.

Computer software for performing the processes hereinabove discussed is provided in the attached software appendix. Table F correlates the program headings with the process steps depicted in FIGS. 1 and 2.

TABLE F

| Chart Representation | Program Call |
|---|---|
| Normalize Acoustic Series 14 | dcrm |
| Window Time Series 16, FFT and Power Spectrum 18 | wfft |
| Bark Analysis 20 | bark |
| Relative Power/Frame 22 | relpow |
| Highest Frequency Representation 24 | hfreg |
| Normalize Bark Values | rbark |
| Cubic Spline Approximation 34 | spline |
| Smooth Articulatory Data 36 | Smooth |
| Normalize Articulatory Data 42 | rspline |
| Compute Articulatory Variables 44 | closure; diff |
| Train Neural Network | bp |
| Compare Inferred and Template Patterns 58 | match; peakpit |

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

PROGRAM APPENDIX LISTING

TIME SERIES ASSOCIATION LEARNING

```
      program bark
c     This program divides the power spectral estimate values
c     into bark bins. The idea here is to group the
c  frequencies
c     in bins that approximate the resolution of human
c     hearing. Inputs are the power spectral estimate file
c     (ni per frame) from standard input. Outputs are 18
c  bark
c     bin values to standard output. Nineteen values are
c  actually
c     computed but only 18 values are being used in the
c  analysis.
c     The first bark is eliminated because it appears to be
c  correlated with, and hence redundant with
c  the second bark interval.
c
c Description of program variables
c ****************************
c     nd is the number of data points
c     ni is the number of numbers in each frame of the fft
c  output
c     (This value is usually half the window size plus one)
c     nb is the number of bark bins listed in <bandwidths>
c     f vector containing the original freq values
c     freqwidth is the distance between each power spectral
c  value
c     halffreqwid is half of the frequency width
c     fl is the lower bound of the power spectrum bins
c     fu is the upper bound of each power spectrum bin
c     fq is the size of a freq interval
c     ftmp is a temporary vector which holds the points in a window
c  while computing the bark value for that interval
c     bark contains the bark value
c     bandupper is the upper bound of a freq bin
c     bandlower is the lower bound of a freq bin
c     context is the number of points per window
c     sampfreq is the acoustic data sampling frequency
c
c
c Declaration of variables
c **********************
      parameter (nd=300000,ni=33,nb=19)
      real f(nd), freqwidth, halffreqwid, fu(ni), fl(ni),fq
      real ftmp(ni)
      real bark(nb),context,sampfreq,bandupper(nb),bandlower(nb)
      integer count,d
c
c Set the context or windowsize and the frequency size
c ******************************************
      context = 2*ni - 2
      sampfreq = 10000
c
c Establish the critical bandwidth boundaries
c *************************************
      bandlower(1)=0.0
      bandupper(1)=100.0
```

```
        bandlower(2)=100.0
        bandupper(2)=200.0
        bandlower(3)=200.0
        bandupper(3)=300.0
        bandlower(4)=300.0
        bandupper(4)=400.0
        bandlower(5)=400.0
        bandupper(5)=510.0
        bandlower(6)=510.0
        bandupper(6)=630.0
        bandlower(7)=630.0
        bandupper(7)=770.0
        bandlower(8)=770.0
        bandupper(8)=920.0
        bandlower(9)=920.0
        bandupper(9)=1080.0
        bandlower(10)=1080.0
        bandupper(10)=1270.0
        bandlower(11)=1270.0
        bandupper(11)=1480.0
        bandlower(12)=1480.0
        bandupper(12)=1720.0
        bandlower(13)=1720.0
        bandupper(13)=2000.0
        bandlower(14)=2000.0
        bandupper(14)=2320.0
        bandlower(15)=2320.0
        bandupper(15)=2700.0
        bandlower(16)=2700.0
        bandupper(16)=3150.0
        bandlower(17)=3150.0
        bandupper(17)=3700.0
        bandlower(18)=3700.0
        bandupper(18)=4400.0
        bandlower(19)=4400.0
        bandupper(19)=5000.0
c
c Compute # of frequency bins, width of bin and half width of bin, in FFT
c ***********************************************************
        numbins = context/2
        freqwidth = sampfreq / 2 / numbins
          halffreqwid = freqwidth / 2
c
c Initialize the upper and lower bounds of the first freq bin
c and set the interval width for all other frequency bins
c ***********************************************************
        fl(1) = 0
        fu(1) = halffreqwid
        fq = halffreqwid
        count = 2
c
c Compute intervals for averaged frequency values
c ***********************************************************

30  continue
```

```fortran
        if (fq .lt. sampfreq/2) then
          fl(count) = fq
          fq = fq + freqwidth
          fu(count) = fq
          count = count + 1
          goto 30
        endif
c
c  The upper bound of the last bin must always be half the
c  frequency plus one. So it is set to that.
c  **********************************************************
        fu(count-1) = sampfreq / 2 + 1 c
c  Read all frequency values changing neg ones to zero.
c  Frequencies cannot be negative so all values less than zero
c  are considered to be zero.
c  **********************************************************
        nk=0
        do 5 d=1,nd
          read(5,*,end=6) f(d)
          nk=nk+1
          if (f(d) .lt. 0) f(d) = 0.0
  5     continue
  6     continue c
c  Initialize all barks to zero
c  ******************************
        do 45 i = 1,nb
          bark(i) = 0
 45     continue c
c  The overall scheme for computing the value of each bark is to find
c  the amount of energy contained in each bark. This simple involves
c  computing the area under the curve of the values in the bark being
c  computed at the time.
c  ******************************************************************
c
        do 76 d = 1,nk,numbins+1
c
c  Store frequency bin values for a window in a temporary buffer
c  **************************************************************
          do 69 j=1,numbins+1
            ftmp(j) = f(d+j-1)
 69       continue
c
c  Compute bark bin values for each window
c  ******************************************
          do 70 i = 1,nb
c
c  Check for special conditions before computing the area of the
c  smaller rectangle
c  **************************************************************
```

```
      do 71 j=1,numbins + 1
        if (fl(j) .gt. bandlower(i)) then
          jfs = j - 1
          go to 72
        endif if (fl(j) .eq. bandlower(i)) then
          jfs = j
          go to 72
        endif
 71   continue
 72   continue c
c  Compute the area of the lower rectangle
c  ******************************************
      areal = (bandlower(i) - fl(jfs)) * ftmp(jfs)

do 73 j = jfs, numbins+1 if (fu(j) .ge. bandupper(i)) then
          jfe = j
          go to 74
        endif
 73   continue
 74   continue c
c  Compute the area of the upper rectangle
c  ******************************************
      areau = (fu(jfe) - bandupper(i)) * ftmp(jfe)

fsum = 0.0 do 75 j = jfs, jfe
        fsum = fsum + (ftmp(j)*(fu(j) - fl(j)))
 75   continue
c
c  Compute the bark value
c  ********************
      bark(i) = fsum - areau - areal
      bark(i) = bark(i) / (bandupper(i)-bandlower(i))
 70   continue c
c  Write output to standard output
c  ******************************
      do 81 k=1,nb
        write(6,*) bark(k)
 81   continue
 76   continue
c
      stop
      end
```

```
      program closure
c  This program computes the closure of two channels and stores its output
c  standard output. Euclidean distance is
c  used to compute the closure.
c
c  Variable Definitions
c  *******************
c    nd is the maximum number of values this program will process
c    n is the loop control variable
c    x is the x motor channel value
c    y is the y motor channel value
c    eucliddistance is the euclidean distance between x and y
c
c  Variable Declarations
c  *******************
       parameter (nd=10000)
       integer n
       real x, y, eucliddistance c
c  Open the output files
c  *********************
       open(unit=3, file='channe.sx')
       open(unit=4, file='channe.sy')
c
c  Read in values and continue processing until eof of the x channel
c  ****************************************************************
       do 10 n=1,nd
         read(3,*,end=20) x
         read(4,*) y
c
c  Formula for computing Euclidean distance
c  ****************************************
         eucliddistance = sqrt(x*x + y*y)
         write(6,*) eucliddistance
   10  continue
c
c  End of data stop processing
c  ***************************
   20  continue
       stop
       end program dcrm
c
c     This program takes as input the datafile <r001.dat for example
c     and computes the transformed vector which contains the
c     original data with the dc component removed. The output is
c     written to standard output (the screen).
c  -----------------------------------------------------------------
c
c  Variable Definitions
c  --------------------
c     nk is the number of data points in the file
c     nd is the maximum allowable data points
c     ni is the context, or number of points per frame
c     val is a vector containing the timeseries data
```

```
c      transform is a vector containing the timeseries with dc component
c        removed
c      sum1 is the sum of the timeseries values
c      avg1 is the average of the timeseries values
c
c  Variable Declarations
c  --------------------
       parameter (nd=300000,ni=64)
       integer  val(nd), transform(nd)
c
c
c  Data input section
c  -----------------
       nk = 0
       do 5 j=1,nd
         read(5,*,end=8) val(j)
           nk = nk + 1
    5  continue
    8  continue
c
c  Compute the average of all points in the file
c  ---------------------------------------------
       sum1 = 0
       do 16 j=1,nk
   16       sum1 = sum1 + val(j)
       avg1 = sum1 / real(nk)

c  Subtract average computed above from each point in the original set
c  -------------------------------------------------------------------
          do 30 j=1,nk
          transform(j) = val(j) - avg1
            write(6,*) transform(j)
   30   continue
        stop
        end program difference
c  This program calculates the difference between two motor channels.
c  There is no special algorithm here.  The two channel values are
c  read in and subtracted from each other. The input is from tmp files
c  and the output is to standard output (the screen).
c*****************************************************************
c
c  Variable Definition
c  *******************
c
c   nd is the maximum number of inputs to this program
c   n is the loop control variable
c   x1 is the first motor channel value
c   x2 is the second motor channel value
c   diff is the difference between the two motor channels
c
c  Variable Declarations
c  ********************
        parameter(nd=10000)
        integer n
        real x1, x2, diff
```

```
c
c  Open input files
c  ****************
      open(unit=3, file='tmp1')
      open(unit=4, file='tmp2')
c
c  Read inputmovements, calculate difference and write the output
c  until the end of file is reached in the first motor channel.
c  ****************************************************************
      do 10 n=1,nd
        read(3,*,end=20) x1
        read(4,*) x2
        diff = x2 - x1
        write(6,*) diff
 10   continue c
c  End of file is reached so stop processing
c  ******************************************
 20   continue
      close(unit=3)
      close(unit=4)

stop
      end
f     program fft
c
c     A program to do the fft on windowed overlapping segments of the
c     wisc data.
c
c  Variable Definitions
c  *********************
c     nd is the maximum number of data points
c     ni is the window size
c     nj is half the window size, or step size
c     psd is the power spectral density vector
c        data is the vector containing the input
c     r is the vector containing the fft values
c
c  Variable Declarations
c  **********************
      parameter (nd=150000,ni=64)
      real  r(ni), wsave(2*ni+15),psd(ni/2+1)
      real data(nd)
      integer d
c  Window macro
c  ************
      window(j)=(1.-(((j-1)-facm)*facp)**2)
c
      nj = ni/2
c
c  This is a rectangular window
c  ****************************
c     window(j)=1
c
c  This is a welch window
```

```
c      ********************
       facm=nj-0.5
       facp=1./(nj+0.5)
c
c   Data input section
c      ******************
       nk = 0
       do 10 d=1,nd
         read(5,*,end=20) data(d)
         nk = nk + 1
 10    continue
 20    continue
c
c   Apply appropriate window to data
c      ********************************
       do 40 d=1,nk-nj,nj
         k=0
         do 30 i=d,ni+d-1
           k=k+1
           r(k) = data(i)*window(k)
 30      continue
c
c   Call routines to compute the fft
c      ********************************
         call RFFTI(ni,wsave)
         call RFFTF(ni,r,wsave)
         do 32 i=1,ni
           r(i) = r(i)*ni
 32      continue
c
c   Compute the power spectral density values
c      *****************************************
         call psdsr (ni,r,psd)
c
c   Convert power spectral density values to db scale
c      *************************************************
         do 35 j=1,nj+1
           psd(j) = 5*log(psd(j))
           write(6,*) psd(j)
 35      continue
 40    continue
       stop
       end
c
       subroutine psdsr (n,r,psd)
c      Returns the power spectral density estimation, based on output
c      RFFTF and formalized to mean square power at consequtively numbered
c      fourier frequencies.
c
       real r(n),psd(n/2+1),rn
       integer n
       rn = 1./(REAL(n)**2)
       psd(1) = rn *(r(1)**2)
c
       do 50 i=2,(n-2),2
         k = (i+2)/2
```

```
              psd(k) = rn * ((r(i)**2) + (r(i+1)**2))
   50    continue
c
         psd((n/2)+1) = rn *(r(n)**2)
         return
         end program hfreq
c     This program takes the frequencies in the last bark bins,
c     sums them and normalizes them so that they are between 0 and
c     1. This high frequency measure is used as input to the net
c     to distinguish the fricatives from other sounds.
c
c Description of program variables
c *****************************
c     nd is the number of bark bins
c
c
c Declaration of variables
c ********************
         parameter (nd=19, nframes=5000)
         real freq(nframes), freq18(nframes), freq19(nframes), minx, maxx
           real minx18, minx19, maxx18, maxx19
         integer nmin, nmax, nmin18, nmax18, nmin19, nmax19
         integer count,d
c
         do 20 count = 1, nframes
           do 10 d = 1, nd-2
             read(5,*,end=30) val
   10      continue
c
           read(5,*) val1
           freq18(count) = val1
           read(5,*) val2
           freq19(count) = val2
           freq(count) = val1 + val2
   20    continue
   30    continue count = count - 1
c
         nmax = ismax(count,freq,1)
         nmax18 = ismax(count,freq18,1)
         nmax19 = ismax(count,freq19,1)
         nmin = ismin(count,freq,1)
         nmin18 = ismin(count,freq18,1)
         nmin19 = ismin(count,freq19,1)
         maxx = freq(nmax)
         maxx18 = freq18(nmax18)
         maxx19 = freq19(nmax19)
         minx = freq(nmin)
         minx18 = freq18(nmin18)
         minx19 = freq19(nmin19)
       rangex = maxx - minx
       rangex18 = maxx18 - minx18
       rangex19 = maxx19 - minx19
```

```
      write(16,*) '#lty 1.1'
      write(16,*) '#lt "Normalized high freq 18 + 19"'
      write(18,*) '#lty 1.1'
      write(18,*) '#lt "Normalized high freq 18"'
      write(19,*) '#lty 1.1'
      write(19,*) '#lt "Normalized high freq 19"'
      do 40 d = 1, count
        freq(d) = (freq(d) - minx) / rangex
        freq18(d) = (freq18(d) - minx18) / rangex18
        freq19(d) = (freq19(d) - minx19) / rangex19
        write (6,*) freq19(d)
        write (16,*) d, freq(d)
        write (18,*) d, freq18(d)
        write (19,*) d, freq19(d)
 40   continue
      stop
      end program relpow
c
c     This program takes as input the output of dc.f
c     and computes the average log power for overlapping frames.
c     It outputs to standard output the relative power per frame.
c
c Variable Definitions
c --------------------
c     nk is the number of data points in the file
c     nd is the maximum allowable data points
c     ni is the context; number of points per frame
c     nf is index of number of frames
c     power is the vector containing the relative power
c     transform is the vector containin the dc removed
c     timeseries
c
c Variable Declarations
c ---------------------
      parameter (nd=150000,ni=128)
      real power(nd), transform(nd)
      integer f
c
      nj = ni/2
c Data input section
c ------------------
      nk = 0
      do 5 j=1,nd
        read(5,*,end=8) transform(j)
        nk = nk + 1
 5    continue
 8    continue
c
c Prepare a time series graph of the dc removed values
c -----------------------------------------------------
c     write(11,*) '#lty 1.1'
c     write(11,*) '#lt "dc removed time series"'
```

```
c       do 10 k=1,nk
c 10            write(11,*) k,transform(k)
c
c  Compute the db root mean squared power for each frame
c  ---------------------------------------------------
c       Prepare graph of db power
c       ------------------------
c       write(14,*) '#lty 1.1'
c       write(14,*) '#lt "db/frame"'
c       write(14,*) '#lx "frames"'
c       write(14,*) '#ly "db"'
c
c  Compute the average power/frame
c  -------------------------------
        nf=0
        do 45 k=1,nk-nj,nj
        nf=nf+1
        sum2 =0
        do 40 j = k,ni+k-1
        sum2 = sum2 + transform(j)**2
 40     continue
        avg = sum2/real(ni)
        power(nf) = sqrt(avg)
        power(nf) = 10 * log(power(nf))
c
c       write(14,*) nf,power(nf)
 45     continue
c
c       Convert to relative power
c       -------------------------
        max =isamax(nf,power,1)
        min =isamin(nf,power,1)
        range = power(max) - power(min)

c       Prepare graph of relative power
c       -------------------------------
        write(10,*)'#lty 1.1'
        write(10,*) '#lt "power/frame"'
        write(10,*) '#lt "relative power/frame"'
        write(10,*) '#lx "frames"'
        write(10,*) '#ly "relative db"' open (unit=7, file='.rlp')

do 50 f=1,nf
                relpow = (power(f)-power(min))/range
                write(6,*) 1
            write(7,*) relpow
                write(10,*) f,relpow
 50     continue
        stop
        end program rbark
c
c       This program is used for changing barks into relative
```

```
c       vectors. The normalization scheme is as follows: Each frame is given
c       a value proportional to its relative power in the entire record.
c       Then each bark frequency bin in each frame is given a value proportionate to its
c       relative power in its frame.
c           The input is the output of bark.f which has 19 numbers per frame
c           and the output is relative bark power, with the first bark dropped,
c           so we have 18 numbers per frame.
c
c  Variable definitions
c  --------------------
c       ni is number of barks
c       nd is the maximum number of input values
c       data is the vector containing the input values
c       tmpdata temporarily stores values in a bin
c       relpow is a vector containing the relative power values
c
c  Variable declarations
c  ---------------------
        parameter (nd=300000,ni=19)
        real bark(ni),relpow(nd),data(nd),tmpdata(ni)
        integer f
c
c  Data input section
c  ------------------
c
c  Reading in bark bin values
c  --------------------------
        nk=0
        do 1 k=1,nd
        read(5,*,end=2) data(k)
        nk=nk+1
    1   continue
    2   continue
c
        open(unit=2,file='avg.out',status='old')
c
c  Reading in relative power values
c  --------------------------------
        do 3 f=1,nd
        read(2,*,end=4) relpow(f)
    3   continue
    4   continue
        close(unit=2)
c
        f=0
        do 30 k=1,nk,ni
        f=f+1
        sum = 0.0
        nbin=0
c
c  Sum the values in each bin
c  --------------------------
        do 31 i=k,ni+k-1
        nbin =nbin+1
        tmpdata(nbin)=data(i)
        sum = sum + data(i)
```

```
   31   continue
c
c  Perform normalization
c  ---------------------
      do 32 i=2,ni
        bark(i) = (relpow(f) * tmpdata(i))/sum
        write(6,*) bark(i)
   32 continue
   30 continue
c
      stop
      end
      program smooth
c  This program smooths the motor data after the spline has
c  been computed. It is done to remove recording apparatus.
c  It gets its input from rspline.f. The algorithm is from
c  Numerical Recipes and the smooft routine and other routines
c  are from their library.
c  *******************************************************
c
c  Variable definitions
c  ********************
c  np is the number of splined values computed for the motor
c    data
c  v is the buffer that contains the input data
c  nt is the number of files on which to compute the smoothing
c
c  Variable declarations
c  ********************
      parameter (np=1966, nt=200)
      character*10 indata
      dimension v(4096)
c
c  Data Input Section
c  ******************
      open(unit=13, file='tmp1')
      do 50 ni=1,nt
        nk = 0
        read(13,*,end=60) indata
c
        open(unit=4, file=indata)
        do 10 i=1,np
          read(4,*,end=15) v(i)
          nk = nk + 1
   10   continue
        close (unit=4)
c
   15   continue
c
c  Prepare graph of input data
c  ***************************
        do 20 k=1,nk
          write(1,*) k,v(k)
   20   continue
c
c  Call routine to perform smoothing
c  *********************************
```

```
      call smooft(v,np,30.0)
c
c Write results
c ************
      open(unit=4, file=indata//'1')
      do 30 k=1,nk
        write(4,*) v(k)
  30  continue
      close(unit=4)
c
c Prepare graph of smoothed output
c ********************************
      write(1,*) '#cs .2'
      write(1,*) '#c \\\oc'
      write(1,*) '#lb0'
      do 40 k=1,nk
        write(1,*) k,v(k)
  40  continue
  50  continue
  60  continue
      stop
      end program spline
c     This program performs a cubic spline of all the articulatory data.
c
c Description of program variables
c --------------------------------
c     nd is the maximum number of points allowed for input
c
c     nj is half the number of points in a window, i.e. the overlap size
c
c     d is the loop control variable
c
c     data is the array containing the original Wisc data for a motor channel
c
c     x, w, work, t and bcoef are arrays used by BINT4 and BVALU to compute
c     the splined data points
c
c     hz is the sampling frequency of the input motor channel read from
c     the input script (do.spline)
c
c     ts is the number of auditory time steps per motor sampling point
c     WARNING: The auditory sampling rate is fixed at 10000 Hz.
c
c     nwc is the number of points in the acoustic data
c
c     numvals is the number of points in the splined output
c
c Initialization and declaration of input values
c ----------------------------------------------
      parameter (nd=126000, nj=64)
      integer d
      real data(nd)
      real x(nd), w(5*(nd+2)), work(12), t(4+nd), bcoef(nd+2)
c
c Input data for processing. The 'tmp' file contains the sampling frequency
```

```
c   of the motor channel being processed and the number of points to be inter-
c   polated.
c   ----------------------------------------------------------------
        open(unit=3, file='tmp')
        read(3,*) hz
        ts = 1.0/hz * 20000
c       print*, hz, ts
        read(3,*) nwc
        nwc = nwc/REAL(nj) - 1
c           print*, nwc
        close(unit=3)
c
c   Data is being read into the second position in the array so that we can
c   evaluate the spline at a point zero.  Failing to do this caused errors in
c   BVALU because we need to evaluate points outside of the range.
c   ----------------------------------------------------------------
        nk = 0
        do 1 d = 2,nd
            read(5,*,end=2) data(d)
 1          nk=nk+1
 2      continue
        data(1) = data(2)
        data(nk+1) = data(nk)
        nk = nk + 1
c       write(6,*) nk,'nk'
c
c   Compute the x values for the cubic spline routine.  A sampling point
c   (data) occurs every ts time step.  The first point occurs at zero.
c   ----------------------------------------------------------------
        x(1) = 0
        do 3 d = 2,nk
            x(d) = x(d-1) + ts
 3      continue
c
c
c   This section is done to allow for extrapolation of values outside the
c   actual number of data values.  The scheme here is to compute the upper
c   range of the number of points we will need and duplicate the last value
c   in the coefficient vector(data) in these additional vector spaces of the
c   coefficient vector.
c   ----------------------------------------------------------------
        numvals = nj*nwc 4      continue
        if (x(nk) .lt. numvals) then
        nk = nk + 1
            x(nk) = x(nk-1) + ts
            data(nk) = data(nk-1)
            goto 4
        endif c   Initialize values for the BINT4 and BVALU routines.
c   ----------------------------------------------------------------
        ibcl = 2
        ibcr = 2
        fbcl = 0.0
```

```
      fbcr = 0.0
      kntopt = 2
      n = nk + 2
      k = 4
c
c Routine to perform spline. BINT4 is a subroutine from the Common
c Los Alamos Mathematical Software (CLAMS) Library. It computes the
c B representation (x,bcoef,n,k) of a cubic spline (order (k) = 4)
c which interpolates data in the arrays x and data with an index of 1
c to nk.
c -----------------------------------------------------------------
      call BINT4(x,data,nk,ibcl,ibcr,fbcl,fbcr,
     *     kntopt,t,bcoef,n,k,w)
c
c Initialize values for the BVALU function
c -----------------------------------------
      ideriv = 0
      inbv = 1
      y=0
c Evaluate the splined function at the desired points. BVALU is a
c function from the CLAMS Library that evaluates the B representation
c (t,a,n,k) of a B spline at x for the function value on ideriv=0 or
c any of its derivatives on ideriv=1,2,...k-1.

do 10 d=1,nwc
      y = y+nj
      out=bvalu(t,bcoef,n,k,ideriv,y,inbv,work)
      nyy = y*0.1
      write(14,*) nyy, out
      write(6,*) out
 10   continue
      stop
      end
      SUBROUTINE SMOOFT(Y,N,PTS)
      PARAMETER(MMAX=4096)
      DIMENSION Y(MMAX)
      M=2
      NMIN=N+2.*PTS
 1    IF(M.LT.NMIN)THEN
         M=2*M
      GO TO 1
      ENDIF
      IF(M.GT.MMAX) PAUSE 'MMAX too small'
      CONST=(PTS/M)**2
      Y1=Y(1)
      YN=Y(N)
      RN1=1./(N-1.)
      DO 11 J=1,N
         Y(J)=Y(J)-RN1*(Y1*(N-J)+YN*(J-1))
 11   CONTINUE
      IF(N+1.LE.M)THEN
         DO 12 J=N+1,M
            Y(J)=0.
 12      CONTINUE
      ENDIF
      MO2=M/2
```

```
         CALL REALFT(Y,MO2,1)
         Y(1)=Y(1)/MO2
         FAC=1.
         DO 13 J=1,MO2-1
            K=2*J+1
            IF(FAC.NE.0.)THEN
               FAC=AMAX1(0.,(1.-CONST*J**2)/MO2)
               Y(K)=FAC*Y(K)
               Y(K+1)=FAC*Y(K+1)
            ELSE
               Y(K)=0.
               Y(K+1)=0.
            ENDIF
13       CONTINUE
         FAC=AMAX1(0.,(1.-0.25*PTS**2)/MO2)
         Y(2)=FAC*Y(2)
         CALL REALFT(Y,MO2,-1)
         DO 14 J=1,N
            Y(J)=RN1*(Y1*(N-J)+YN*(J-1))+Y(J)
14       CONTINUE
         RETURN
         END

SUBROUTINE FOUR1(DATA,NN,ISIGN)
         REAL*8 WR,WI,WPR,WPI,WTEMP,THETA
         DIMENSION DATA(*)
         N=2*NN
         J=1
         DO 11 I=1,N,2
            IF(J.GT.I)THEN
               TEMPR=DATA(J)
               TEMPI=DATA(J+1)
               DATA(J)=DATA(I)
               DATA(J+1)=DATA(I+1)
               DATA(I)=TEMPR
               DATA(I+1)=TEMPI
            ENDIF
            M=N/2
1           IF ((M.GE.2).AND.(J.GT.M)) THEN
               J=J-M
               M=M/2
            GO TO 1
            ENDIF
            J=J+M
11       CONTINUE
         MMAX=2
2        IF (N.GT.MMAX) THEN
            ISTEP=2*MMAX
            THETA=6.28318530717959D0/(ISIGN*MMAX)
            WPR=-2.D0*DSIN(0.5D0*THETA)**2
            WPI=DSIN(THETA)
            WR=1.D0
            WI=0.D0
            DO 13 M=1,MMAX,2
               DO 12 I=M,N,ISTEP
                  J=I+MMAX
                  TEMPR=SNGL(WR)*DATA(J)-SNGL(WI)*DATA(J+1)
```

```
                TEMPI=SNGL(WR)*DATA(J+1)+SNGL(WI)*DATA(J)
                DATA(J)=DATA(I)-TEMPR
                DATA(J+1)=DATA(I+1)-TEMPI
                DATA(I)=DATA(I)+TEMPR
                DATA(I+1)=DATA(I+1)+TEMPI
12           CONTINUE
             WTEMP=WR
             WR=WR*WPR-WI*WPI+WR
             WI=WI*WPR+WTEMP*WPI+WI
13        CONTINUE
          MMAX=ISTEP
       GO TO 2
       ENDIF
       RETURN
       END
       SUBROUTINE REALFT(DATA,N,ISIGN)
       REAL*8 WR,WI,WPR,WPI,WTEMP,THETA
       DIMENSION DATA(*)
       THETA=6.28318530717959D0/2.0D0/DBLE(N)
       C1=0.5
       IF (ISIGN.EQ.1) THEN
          C2=-0.5
          CALL FOUR1(DATA,N,+1)
       ELSE
          C2=0.5
          THETA=-THETA
       ENDIF
       WPR=-2.0D0*DSIN(0.5D0*THETA)**2
       WPI=DSIN(THETA)
       WR=1.0D0+WPR
       WI=WPI
       N2P3=2*N+3
       DO 11 I=2,N/2+1
          I1=2*I-1
          I2=I1+1
          I3=N2P3-I2
          I4=I3+1
          WRS=SNGL(WR)
          WIS=SNGL(WI)
          H1R=C1*(DATA(I1)+DATA(I3))
          H1I=C1*(DATA(I2)-DATA(I4))
          H2R=-C2*(DATA(I2)+DATA(I4))
          H2I=C2*(DATA(I1)-DATA(I3))
          DATA(I1)=H1R+WRS*H2R-WIS*H2I
          DATA(I2)=H1I+WRS*H2I+WIS*H2R
          DATA(I3)=H1R-WRS*H2R+WIS*H2I
          DATA(I4)=-H1I+WRS*H2I+WIS*H2R
          WTEMP=WR
          WR=WR*WPR-WI*WPI+WR
          WI=WI*WPR+WTEMP*WPI+WI
11     CONTINUE
       IF (ISIGN.EQ.1) THEN
          H1R=DATA(1)
          DATA(1)=H1R+DATA(2)
          DATA(2)=H1R-DATA(2)
       ELSE
```

```
            H1R=DATA(1)
            DATA(1)=C1*(H1R+DATA(2))
            DATA(2)=C1*(H1R-DATA(2))
            CALL FOUR1(DATA,N,-1)
        ENDIF
        RETURN
        END
      program match
      include 'match.ini'
      read(5,1005) filename
 1005 format(A13)
      write(6,*) filename
c     write(6,*) nc,'=nc ',ni,'=ni ',nw,'nw '
      if(covar)write(6,*) 'covar=',covar
      if(berkbig)write(6,*) 'berkbig=', berkbig
      if(ccorr)write(6,*) 'ccorr=',ccorr
      if(manhatan)write(6,*) 'manhatan=',manhatan
      if(euclid)write(6,*) 'euclid=',euclid
      write(6,*) 'deviate=',deviate
      if(covmat)write(6,*) 'covmat=',covmat
      if(cormat)write(6,*) 'cormat=',cormat
      if(zscore)write(6,*) 'zscore=',zscore
c     write(6,*) 'peak=',peak
c
c***********Input the files to be read***********************
      open(1,file=filename,status='old')
      read(1,*) nt
      write(6,*) nt,' nt'
      do 1 c=1,nc
         do 1 k=1,2
          read(1,1000) files(c,k)
c            write(6,1000) files(c,k)
   1  continue
 1000 format(36A)
      close(1)
c
c***********Input the data and templates to be scanned***********
      do 2 c=1,nc
         open(1,file=files(c,1))
         read(1,*) (odata(c,i),i=1,ni-nw+1)
         close(1)
         open(1,file=files(c,2))
         read(1,*) (templ(c,i),i=1,nt)
         close(1)
   2  continue
c 10  write(6,*) 'input complete'
      write(6,*) 'weights:',weights
c
c     pause
c***********Compute the distance*****************************
      if(deviate)call templdif()
      do 11 i=1,ni-(nw-1)-nt+1
  11     dist(i)=0.0
c     pass the template through the data
      if(covmat.or.cormat) then
      if(covmat.and.cormat)write(6,*)'Make up your mind'
```

```
           if(covmat)call cvtmat()
           if(cormat)call cctmat()
           do 49 i=1,ni-(nw-1)-nt+1
              do 48 c=1,nc
 48              call minusavg(i)
                 if(covmat) call cvmat(i,value)
                 if(cormat) call ccmat(value)
 49        dist(i)=value
        else
        do 60 c=1,nc
           do 50 i=1,ni-(nw-1)-nt+1
              call minusavg(i)
              if(euclid)call eudist(i,value)
              if(manhatan)call mandist(value)
              if(ccorr)call ccdist(value)
              if(covar)call cvdist(value)
c       dist(i)=dist(i) + value
        dist(i)=dist(i) + value*weights(c)
 50     continue
 60     continue
        endif
        if(euclid)then
        do 70 i=1,ni-(nw-1)-nt+1
 70            dist(i)=sqrt(dist(i))
        endif
c*********** Print the output nd the peaks*************************
        if(euclid.or.manhatan)then
           if(zscore)then
              ss=0.0
              a=0
              k=0
              do 28 i=1,ni-(nw-1)-nt+1
                 k=k+1
 28              a=a + dist(i)
              a=a/real(k)
              do 27 i=1,ni-(nw-1)-nt+1
 27              ss=ss+(dist(i)-a)**2
              sd=sqrt(ss/real(nt-1))
           do 29 i=1,ni-(nw-1)-nt+1
 29        dist(i)=dist(i)/sd
           endif
        do 26 i=1,ni-(nw-1)-nt+1
 26     dist(i)=dist(i)/real(nt)
        endif
        if(euclid.or.covmat.or.manhatan.or.cormat)then
        if(peak)call peakpit(0,dist,(ni-(nw-1)-nt+1),window,theta,
     1  num,locpeak,extrm)
        endif
        if(ccorr.or.covar)then
c       write(6,*) dist
        if(peak)call peakpit(1,dist,(ni-(nw-1)-nt+1),window,theta,
     1  num,locpeak,extrm)
        endif
        write(6,*) num, ' number of peaks'
        write(6,*) extrm, ' value of peaks in order'
        write(6,*) locpeak, ' location of peaks in order'
```

```
c       if(peak)call findpeak()
        if(euclid.or.covmat.or.manhatan.or.cormat)then
        dmin=10000.
        do 12 n=1,num
           if(extrm(n).lt.dmin)then
              rminp=locpeak(n)
              dmin=extrm(n)
           endif
 12     continue
        endif
        if(ccorr.or.covar)then
        dmin=-100000.
        do 13 n=1,num
           if(extrm(n).gt.dmin)then
              rminp=locpeak(n)
              dmin=extrm(n)
           endif
 13     continue
        endif
        write(6,*) 'best match: ', rminp,dmin
        ss=0.0
        do 17 nn=1,num
 17          ss = ss + extrm(nn)
        ss=ss-dmin
        ss=ss/real(num-1)
        stheta=.70*ss
        write(6,*) stheta,'stheta'
c       write(6,*) n, rminp, locpeak(n)
        if(euclid.or.covmat.or.manhatan.or.cormat)then
        ddmin=1000000.
        do 14 n=1,num
         if(extrm(n).lt.ddmin.and.extrm(n).ne.dmin)then
              rrminp=locpeak(n)
              ddmin=extrm(n)
           endif
        ratio=dmin/ddmin
 14     continue
        endif
        if(ccorr.or.covar)then
        ddmin=-1000000.
        do 15 n=1,num
           if(extrm(n).gt.ddmin.and.extrm(n).ne.dmin)then
              rrminp=locpeak(n)
              ddmin=extrm(n)
           endif
        ratio=ddmin/dmin
 15     continue
        endif
        write(6,*) 'next best match: ', rrminp, ddmin
        write(6,*) 'ratio- best/next best: ',ratio
        write(6,*) ' '
          write(2,*) '#lx "frame number"'
          write(2,*) '#ly "Avg. Distance from Template Frame"'
        write(2,*) '#x 0 2000'
c       write(2,*) '#x 0 ',ni-(nw-1)-nt+1
          write(2,*) '#y 1'
          do 30 i=1,ni-(nw-1)-nt+1
```

```
 30      write(2,1003) i,dist(i)
1003 format(1x,i6,2x,f15.5)
     end
*************************************************************
     subroutine templdif()
     include 'match.ini'
c    changes templates to signed deviations from the template mean
     do 10 c=1,nc
        dmean(c)=0.0
        do 11 j=1,ni-(nw-1)
 11          dmean(c)=dmean(c) + odata(c,j)
        dmean(c)=dmean(c)/real(ni-(nw-1))
c    write(6,*) dmean, 'dmean'
c       tmean=0.0
c       do 12 t=1,nt
c 12          tmean=tmean + templ(c,t)
c       tmean=tmean/real(nt)
c
c    find deviation score
        do 20 t=1,nt
c 20          templ(c,t) = templ(c,t) - dmean(c)
  20         templ(c,t) = templ(c,t) - tmean(c)
  10 continue
c    write(6,*) templ(1,1)
     return
     end
*************************************************************
     subroutine minusavg(i)
     include 'match.ini'
c    changes data to signed deviations from the mean of the window
c    or from the mean of the test file
     if(deviate)then
c    find deviation score
     k=0
        do 21 t=i,i+nt-1
           k=k+1
c          write(6,*) wdata(c,k),odata(c,t),dmean(c)
           wdata(c,k) = odata(c,t) - dmean(c)
c          write(6,*) wdata(c,k)
  21    continue
     else
     k=0
        do 31 t=i,i+nt-1
           k=k+1
  31       wdata(c,k)=odata(c,t)
     endif
c    write(6,*) dmean(3)
c    write(6,*) wdata(3,4),odata(3,4)
     return
     end
c*************************************************************
     subroutine eudist(i,value)
c    returns the euclidian distance
     include 'match.ini'
     value = 0.0
     do 10 t=1,nt
```

```
            value =value+ ((templ(c,t) - wdata(c,t))**2)
  10     continue
c        write(6,*) wdata(3,4)
c        k1=684
c        k2=1542
c        if(i.eq.k1.or.i.eq.k2)then
c           write(6,*) c, 'channel ', value,'for frame',i
c        end if
         return
         end
c*************************************************************
         subroutine mandist(value)
c        returns the manhatan distance
         include 'match.ini'
         value = 0.0
         do 10 t=1,nt-1
            value =value+ abs(templ(c,t) - wdata(c,t))
  10     continue
         return
         end
c*************************************************************
         subroutine ccdist(value)
c        returns the cross correlation
         include 'match.ini'
         real ltempl,ldata
c        write(6,*) c
         value=0.0
         ltempl=0.0
         ldata=0.0
         do 10 t=1,nt-1
            ltempl=ltempl+(templ(c,t)*templ(c,t))
            ldata=ldata+(wdata(c,t)*wdata(c,t))
c        if(c.eq.9)write(6,*) ltempl, ldata
            value =value+(templ(c,t)*wdata(c,t))
  10     continue
c        x=sqrt(ltempl)*sqrt(ldata)
c        write(6,*) x
         value=value/(sqrt(ltempl)*sqrt(ldata))
         return
         end
c*************************************************************
         subroutine cctmat()
c        returns the correlation matrix between the templates
         include 'match.ini'
         write(6,*) 'in cctmat'
         do 10 k=1,nc
            do 10 j=k,nc
               a=0.0
               b=0.0
               cvtm(k,j)=0.0
               do 12 t=1,nt
                  a=a+ templ(k,t)*templ(k,t)
                  b=b+ templ(j,t)*templ(j,t)
  12              cvtm(k,j)=cvtm(k,j)+(templ(k,t)*templ(j,t))
               cvtm(k,j)=cvtm(k,j)/(sqrt(a)*sqrt(b))
  10     continue
```

```fortran
        do 11 k=1,nc
11          write(7,1002) (cvtm(k,j),j=1,nc)
1002    format(1x,10f7.2)
        return
        end
c*************************************************************
        subroutine ccmat(value)
c       returns the correlation matrix between template and data
        include 'match.ini'
        value=0.0
        do 10 k=1,nc
          do 10 j=k,nc
            a=0.0
            b=0.0
            cvm(k,j)=0.0
        do 11 t=1,nt
            a=a+templ(k,t)**2
            b=b+wdata(j,t)**2
11          cvm(k,j)=cvm(k,j)+(templ(k,t)*wdata(j,t))
            cvm(k,j)=cvm(k,j)/(sqrt(a)*sqrt(b))
10      continue
c       subtract cvtm from cvm
        do 12 k=1,nc
          do 12 j=k,nc
            diffmat(k,j)=(cvtm(k,j)-cvm(k,j))
            value=value+(cvm(k,j)-cvtm(k,j))**2
12      continue
        value=sqrt(value)
        if(i.eq.743.or.i.eq.210)then
        do 14 k=1,nc
14          write(1,1003) (diffmat(k,j),j=1,nc)
        write(1,*) 'correlation matrix (above) at i ='
1003    format(1x,10f7.2)
        end if
        return
        end
c*************************************************************
        subroutine cvmat(i,value)
c       returns the covariance matrix between two vectors
        include 'match.ini'
c       write(6,*) 'in cvmat'
        value=0.0
        do 10 k=1,nc
          do 10 j=k,nc
            cvm(k,j)=0.0
        do 11 t=1,nt
11          cvm(k,j)=cvm(k,j)+(templ(k,t)*wdata(j,t))
10      continue
c       do 14 k=1,nc
c 14    write(6,1004) (cvm(k,j),j=1,nc)
c1004   format(1x,10f7.3)
c       write(6,*) cvm(1,1),templ(1,1),wdata(1,1)
c       subtract cvtm from cvm
        do 12 k=1,nc
          do 12 j=k,nc
            diffmat(k,j)=(cvtm(k,j)-cvm(k,j))
            value=value+((cvtm(k,j)-cvm(k,j))**2)
```

```
  12  continue
      value=sqrt(value)
c     write(6,*) value,'value'
      if(i.eq.545.or.i.eq.726)then
      do 14 k=1,nc
  14     write(9,1003) (diffmat(k,j),j=1,nc)
      write(9,*) 'covariance matrix (above) at i ='
1003  format(1x,10f7.2)
      endif
      return
      end
c*************************************************************
      subroutine cvtmat()
c     returns the covariance matrix between the templates
      include 'match.ini'
c     write(6,*) 'in cvtmat'
      do 10 k=1,nc
        do 10 j=k,nc
          cvtm(k,j)=0.0
          do 12 t=1,nt
  12        cvtm(k,j)=cvtm(k,j)+(templ(k,t)*templ(j,t))
c           cvtm(k,j)=cvtm(k,j)/real(nt)
  10  continue
      do 11 k=1,nc
  11     write(3,1002) (cvtm(k,j),j=1,nc)
1002  format(1x,10f7.2)
      return
      end
c*************************************************************
      subroutine cvdist(value)
c     returns the covariance between two vectors
      include 'match.ini'
      value=0.0
      do 10 t=1,nt-1
         cv=templ(c,t)*wdata(c,t)
         if(berkbig)cv=cv-
   1     (rho*(abs(sqrt(templ(c,t)**2)-sqrt(wdata(c,t)**2))))
         value =value+cv
  10  continue
      value=value/real(nt)
      return
      end
c*************************************************************
      subroutine findpeak()
      include 'match.ini'
c     find the local minimum
      num = 1
      ptr = .5 * window
c     write (6,*) num,ptr
c
      if(euclid.or.covmat.or.manhatan.or.cormat)then
  10  if (ptr .le. (ni - (nw-1) -nt -.5*window +1)) then
         winmax = -10000.0
         winmin = 10000.0
         do 15 i=ptr - .5*window+1,ptr+.5*window
            if (dist(i) .gt. winmax) winmax = dist(i)
            if (dist(i) .lt. winmin) winmin = dist(i)
```

```
15      continue
        if((dist(ptr).eq.winmin).and.((winmin/winmax).lt.theta))
1       then
            locpeak(num) = ptr
c           write(6,*) locpeak(num),dist(locpeak(num))
            num = num + 1
        endif
        ptr = ptr + 1
        goto 10
      endif
      dmin=10000.
      do 12 n=1,num-1
        if(dist(locpeak(n)).lt.dmin)then
            rminp=locpeak(n)
            dmin=dist(locpeak(n))
        endif
12    continue
      write(6,*) 'best match: ', rminp,dmin
      ddmin=10000.
      do 13 n=1,num-1
c       write(6,*) n, rminp, locpeak(n)
        if(dist(locpeak(n)).lt.ddmin.and.dist(locpeak(n)).ne.dmin)then
            rrminp=locpeak(n)
            ddmin=dist(locpeak(n))
        endif
        ratio=dmin/ddmin
13    continue
      write(6,*) 'next best match: ', rrminp, ddmin
      write(6,*) 'ratio- best/next best: ',ratio
      write(6,*) ' '
    else
11    if (ptr .le. (ni - (nw-1) -nt -.5*window +1)) then
        winmax = -100000.0
        winmin = 1000000.0
        do 16 i=ptr - .5*window+1,ptr+.5*window
            if (dist(i) .gt. winmax) winmax = dist(i)
            if (dist(i) .lt. winmin) winmin = dist(i)
16      continue c       write(6,*) winmax, ptr, 'winmax ptr'
        if((dist(ptr).eq.winmax).and.((winmax/winmin).lt.theta))
1       then
            locpeak(num) = ptr
            write(6,*) locpeak(num),dist(locpeak(num))
            num = num + 1
        endif
        ptr = ptr + 1
        goto 11
      endif
c     write(6,*) 'Maximum peaks not yet loaded'
    endif
    return
    end
c*********************************************************
      subroutine normal(vec,n)
c     returns a vector such that the maximum value is 1 and the min is 0
```

```
c
      real vec(n)
      rmin=1.0
      rmax=0.0
      do 10 i=1,n
      if (vec(i).gt.rmax)rmax=vec(i)
 10   if(vec(i).lt.rmin)rmin=vec(i)
c
      range=rmax-rmin
      do 20 i=1,n
 20   vec(i)= (vec(i)-rmin)/range
      return
      end
c
      parameter (nd=1966,nb=18,nw=90)
      parameter (ni=nw*nb, nhlayer=2, nh1=5, nh2=5, no=1)
      parameter (np=(ni*nh1)+nh1+(nh1*nh2)+nh2+(nh2*no)+no)
c
      real d(nb,nd), desired(nd,no), des(no), output(nd,no)
      real hu1(nh1), hu2(nh2), out(no)
      real w1(ni,nh1), w2(nh1,nh2), w3(nh2,no)
      real theta1(nh1), theta2(nh2), theta3(no)
      real errorh1(nh1), errorh2(nh2), error(no)
      real deltah1(nh1), deltah2(nh2), deltao(no)
      real wed1s(ni,nh1), wed2s(nh1,nh2), wed3s(nh2,no)
      real wed1(ni,nh1), wed2(nh1,nh2), wed3(nh2,no)
      real thed1s(nh1), thed2s(nh2), thed3s(no)
      real thed1(nh1), thed2(nh2), thed3(no)
      real deltaw1(ni,nh1), deltaw2(nh1,nh2), deltaw3(nh2,no)
      real deltath1(nh1), deltath2(nh2), deltath3(no)
      real xi(np), p(np), whtrng(2)
      real lr, ar, mr, cr, pp, scale, sumerr,shift
      integer b, h1, h2, o, f, list(nd)
      logical epoch, randwt
      integer nit, nf, nwf, npat, iseed, idum
      character*13 motor
c
      common /global/ d, desired, des, hu1, hu2, out, output,
     1         w1, w2, w3, theta1, theta2, theta3,
     2         errorh1, errorh2, error, deltah1, deltah2, deltao,
     3         wed1, wed2, wed3, thed1, thed2, thed3,
     4         wed1s, wed2s, wed3s, thed1s, thed2s, thed3s,
     5         deltaw1, deltaw2, deltaw3, deltath1, deltath2, deltath3,
     6         lr, mr
c
      data motor/'channel value'/
      data nit, cr /5000, 0.12/
      data lr, ar, mr /0.5, .999, 0.5/
      data whtrng /-0.80, 0.80/
      data epoch, randwt /.false., .true./
      data pp, scale, pts /0.50,5.0,50./
      data shift,idum,iseed/0.0,-777,-777/
      data exptrap/1000./
c
c     nd is the maximum number of frames of acoustic data allowed
c     nf is the actual number of frames read in
c     nb is number of bins/frame
```

```
c        nw is number of frames in the window
c        ni is number of units in input layer
c        nhlayer is number of hidden layers (1 or 2)
c          when nhlayer = 1 set nh2 = nh1
c        nh1 is number of units in hidden layer 1
c        nh2 is number of units in hidden layer 2
c        no is number of units in the output layer
c        np is number of items in the weight + bias vector
c        nit is the number of iterations through the pattern presentations
c        iseed and idum are random number seeds, must be a negative number
c        list is the pattern index that gets shuffled for each presentation
c        lr is the learning rate
c        ar is the annealing rate
c        mr is the momentum
c        cr is the error convergence criteria
c        pp is the distance into the context window at which to focus output
c        sumerr is the cumulative sum of squared errors
c        epoch indicates how often to update the weights:
c             f=after each pattern, t=after each epoch
c        randwt indicates whether to generate random weights
c             t=generate random weights, f=read weights from file
c        d is the input accoustic data
c        desired is the output articulator data
c        des is the output point corresponding to the current pattern
c        output is the output computed by the network
c        hu1 is the activation of units in hidden layer 1
c        hu2 is the activation of units in hidden layer 2
c        out is the activation of units in output layer
c        w1 is the weights from input layer to hidden layer 1
c        w2 is the weights from hidden layer 1 to hidden layer 2
c        w3 is the weights from hidden layer 2 to output layer
c        theta1 is the bias for the input layer
c        theta2 is the bias for hidden layer 1
c        theta3 is the bias for hidden layer 2
c        error is the errors in the output layer
c        errorh2 is the backpropagated errors in hidden layer 2
c        errorh1 is the backpropagated errors in hidden layer 1
c        deltao is the error signal for the output units
c        deltah2 is the error signal for the hidden layer 2 units
c        deltah1 is the error signal for the hidden layer 1 units
c        wed1 is the weight error derivative for w1
c        wed2 is the weight error derivative for w2
c        wed3 is the weight error derivative for w3
c        thed1 is the bias error derivative for theta1
c        thed2 is the bias error derivative for theta2
c        thed3 is the bias error derivative for theta3
c        deltaw1 is the change to be made to w1
c        deltaw2 is the change to be made to w2
c        deltaw3 is the change to be made to w3
c        deltath1 is the change to be made to theta1
c        deltath2 is the change to be made to theta2
c        deltath3 is the change to be made to theta3
c        p is the weights and biases in vector form
c        xi is the gradient vector of length np
c        whtrng is the range for the random weights
c     exptrap is the value of at which the squash reaches 1 or 0.
c
```

```
      program bp
c     a 1 or 2 hidden layer net
      include 'bp.ini'
c
c     record parameters on standard output
      write(6,*) 'nb=',nb, ' nw=',nw, ' nd=',nd, ' ni=',ni
      write(6,*) 'nhlayer=',nhlayer,' nh1=',nh1,' nh2=',nh2,' no=',no
      write(6,*) 'nit=',nit, ' cr=',cr, ' seeds=',iseed,idum
      write(6,*) 'lr=',lr, ' ar=',ar, ' mr=',mr
      write(6,*) 'scale=',scale, ' pp=',pp, ' np=',np
      write(6,*) ' epoch=',epoch,'shift=',shift
      write(6,*) 'randwt=',randwt, ' whtrng=',whtrng
c
c********* CHECK THE LAYER STRUCTURE *************************
      if (nhlayer .ne. 1 .and. nhlayer .ne. 2) then
        write (6,*) 'must use 1 or 2 hidden layers'
        stop
      endif
      if (nhlayer .eq. 1 .and. nh1 .ne. nh2) then
        write (6,*) 'nh1 must equal nh2 for 1 hidden layer'
        stop
      endif
c
c****** DATA INPUT SECTION***********************************
      nf =0
      do 1 f=1,nd
        list(f) =f
        read(5,*,end=2) (d(b,f),b=1,nb)
 1      nf=nf+1
 2    continue
c
      write(6,*) 'nf, number of data frames is:',nf
      open(unit=1,file='tmpx',status='old')
      do 3 f=1,nf
 3            read(1,*) desired(f,1)
      close(unit=1)
c     write(6,*) 'input complete'
c
c******** SCALE SECTION *************************************
      do 5 b=1,nb
        do 5 f=1,nf
 5        d(b,f)= scale * d(b,f)
c
c********DEFINE WEIGHTS AND INITIALIZE**********************
      if (randwt) then
        do 6 i=1,np
 6      p(i) = (whtrng(2)-whtrng(1)) *ran2(iseed) +whtrng(1)
        else
        open(unit=3,file='wht.dat',status='old')
        read(3,*,end=101) (p(i),i=1,np)
        close (unit=3)
      endif
      call decomp(p)
c
      do 8 o=1,no
        thed3(o) = 0.0
```

```
         deltath3(o) = 0.0
       do 8 h2=1,nh2
          thed2(h2) = 0.0
          deltath2(h2) = 0.0
          wed3(h2,o) = 0.0
        deltaw3(h2,o) = 0.0
       do 8 h1=1,nh1
          thed1(h1) = 0.0
          deltath1(h1) = 0.0
          wed2(h1,h2) = 0.0
        deltaw2(h1,h2) = 0.0
       do 8 k=1,ni
          wed1(k,h1) = 0.0
        deltaw1(k,h1) = 0.0
  8  continue
c
c    nwf tells how far into the context window the prediction point is
c    npat is the number of pairs to be learned
       nwf = nw*pp
       npat = nf-nw+1
c
c    PREPARE THE ERROR/ITERATION GRAPH
c*******************************************************************
       write(7,*) '#lty 1.1'
       write(7,*) '#lt "Learning Curve"'
       write(7,*) '#ly "Root Mean Square Error"'
       write(7,*) '#lx "Iteration"' c    present the training set to the input nodes, it = iterations
c    present in random permutations of the training set
c
       do 79 it =1,nit
       sumerr=0.0
       lr = lr * ar
c
       if (.not. epoch) call shuffle (list, npat, idum)
       do 89 f=1,npat
c      write(6,*) list(f) ,'working on the window starting at'
c
       do 11 o=1,no
 11        des(o) = desired(list(f)+nwf,o)
c
         call forward (list(f), nwf)
         call backward (sumerr)
         call d_error (list(f))
          if (.not. epoch)call learn
c
  89  continue c    check the error level without changing weights
       sumerr=0.0
       do 91 f=1,npat
       do 92 o=1,no
 92        des(o)=desired(list(f)+nwf,o)
       call forward(list(f),nwf)
       call backward (sumerr)
```

```
   91  continue
       avgerr = sqrt(sumerr/npat)
       write(7,1002) it,avgerr
       write(6,1000) avgerr,'rms error without weight change, it=', it
       if (avgerr .lt. cr) go to 80
         if (epoch)call learn
   79  continue
       write(6,*) 'maxiterations exceeded'
   80  continue
c      write (6,1000) lr, ' final learning rate'
c
c*****Write the Obtained weight matrix*********************
       call compose(p)
       open(unit=10,file='p.dat')
       write(10,*) (p(i),i=1,np)
       close(unit=10)
c
       stop
  101  write (6,*) 'not enough weights in file'
       stop
c
 1000  format (1x,f10.4,a,i4)
 1002  format(1x,i5,2x,f10.5)
 1004  format(1x,A,f9.3)
 1005  format(1x,f9.3)
       end subroutine forward (ip, nwf)
c
c      forward pass for pattern ip
c
       include 'bp.ini'
c
       do 28 h1=1,nh1
         hu1(h1) = 0.0
         do 23 k= 1,ni
   23    hu1(h1) = hu1(h1)+ w1(k,h1)*d(k,ip)
c      find the activation from the input
       rnet=hu1(h1)+theta1(h1)
        if(abs(rnet).gt.exptrap)then
          if(rnet.gt.exptrap)hu1(h1)=1.0
          if(rnet.lt.-exptrap)hu1(h1)=0.0
        else
        hu1(h1) = 1.0/(1.0+exp(-rnet))
        endif
   28  continue
c
c      pass forward to hidden layer 2
       if (nhlayer .eq. 2) then
       do 26 h2=1,nh2
         hu2(h2) = 0.0
         do 21 h1=1,nh1
   21    hu2(h2) = hu2(h2) + w2(h1,h2)*hu1(h1)
       rnet=hu2(h2)+theta2(h2)
       if(abs(rnet).gt.exptrap)then
          if(rnet.gt.exptrap)hu2(h2)=1.
```

```
          if(rnet.lt.-exptrap)hu2(h2)=0.
        else
          hu2(h2) = 1.0/(1.0+exp(-rnet))
        endif
 26   continue
      else
        do 25 h2=1,nh2
 25     hu2(h2) = hu1(h2)
      endif
c     write(6,*) hu2
c
c     pass forward to output layer
      do 30 o=1,no
        out(o) = 0.0
        do 29 h2=1,nh2
 29     out(o) = out(o) + w3(h2,o)*hu2(h2)
        rnet= out(o) + theta3(o)
        if(abs(rnet).gt.exptrap)then
          if(rnet.gt.exptrap)out(o)=1.
          if(rnet.lt.-exptrap)out(o)=0.
        else
          out(o) = 1.0/(1.0+exp(-rnet))
        endif
 30   output(ip+nwf,o) = out(o)
c
      return
      end subroutine backward (sumerr)
c
c     backpropagate the errors
c
      include 'bp.ini'
c
      do 37 o=1,no
      error(o) =  (des(o) - out(o))
      sumerr = sumerr + (error(o)**2)
c
      deltao(o) = error(o) *(out(o) *(1.-out(o))+shift)
 37   continue
c
c     back propagate the error to hidden layer 2***************
      do 36 h2=1,nh2
        errorh2(h2) = 0.0
        do 35 o=1,no
 35     errorh2(h2)= errorh2(h2) + (deltao(o)*w3(h2,o))
c
      deltah2(h2)=errorh2(h2)*(hu2(h2) *(1.-hu2(h2))+shift)
 36   continue
c
c     back propagate the error to hidden layer 1**********
      if (nhlayer .eq. 2) then
      do 41 h1=1,nh1
        errorh1(h1) = 0.0
        do 38 h2=1,nh2
 38     errorh1(h1)= errorh1(h1) + (deltah2(h2)*w2(h1,h2))
```

```
c
         deltah1(h1)=errorh1(h1)*(hu1(h1)*(1.-hu1(h1))+shift)
   41  continue
       else
         do 40 h1=1,nh1
   40    deltah1(h1) = deltah2(h1)
       endif
c
         return
         end subroutine d_error (ip)
c
c        compute error derivatives for weights and biases
c
         include 'bp.ini'
c
         do 15 o=1,no
         thed3(o) = thed3(o) + deltao(o)
           do 10 h2=1,nh2
   10      wed3(h2,o) = wed3(h2,o) + deltao(o) *hu2(h2)
   15    continue
c
       if (nhlayer .eq. 2) then
         do 25 h2=1,nh2
         thed2(h2) = thed2(h2) + deltah2(h2)
           do 20 h1=1,nh1
   20      wed2(h1,h2) = wed2(h1,h2) + deltah2(h2) *hu1(h1)
   25    continue
       endif
c
         do 35 h1=1,nh1
         thed1(h1) = thed1(h1) + deltah1(h1)
           do 30 k=1,ni
   30      wed1(k,h1) = wed1(k,h1) + deltah1(h1) *d(k,ip)
   35    continue
c
         return
         end subroutine learn
c
c        learn new weights
c
         include 'bp.ini'
c
c      adjust w3 weights & theta3
       do 37 o=1,no
       deltath3(o) = lr*thed3(o) + mr*deltath3(o)
c      deltath3(o) = lr*thed3(o)/real(nh2) + mr*deltath3(o)
       theta3(o) = theta3(o) +deltath3(o)
         thed3(o) = 0.0
         do 32 h2=1,nh2
         deltaw3(h2,o) = lr*wed3(h2,o) + mr*deltaw3(h2,o)
c        deltaw3(h2,o) = lr*wed3(h2,o)/real(nh2) + mr*deltaw3(h2,o)
         w3(h2,o)= w3(h2,o) +deltaw3(h2,o)
```

```
 32     wed3(h2,o) = 0.0
 37  continue
c
c    adjust w2 weights and theta2
     if (nhlayer .eq. 2) then
     do 36 h2=1,nh2
     deltath2(h2) = lr*thed2(h2) + mr*deltath2(h2)
     theta2(h2) = theta2(h2) +deltath2(h2)
       thed2(h2) = 0.0
       do 34 h1=1,nh1
        deltaw2(h1,h2) = lr*wed2(h1,h2) + mr*deltaw2(h1,h2)
        w2(h1,h2)= w2(h1,h2) +deltaw2(h1,h2)
 34     wed2(h1,h2) = 0.0
 36  continue
     endif
c
c    adjust w1 weights and theta1
     do 41 h1=1,nh1
     deltath1(h1) = lr*thed1(h1) + mr*deltath1(h1)
c    deltath1(h1) = lr*thed1(h1)/real(ni) + mr*deltath1(h1)
     theta1(h1) = theta1(h1) +deltath1(h1)
       thed1(h1) = 0.0
     do 40 k=1,ni
       deltaw1(k,h1) = lr*wed1(k,h1)+ mr*deltaw1(k,h1)
c      deltaw1(k,h1) = lr*wed1(k,h1)/real(ni)+ mr*deltaw1(k,h1)
       w1(k,h1)= w1(k,h1) +deltaw1(k,h1)
 40    wed1(k,h1) = 0.0
 41  continue
c
     return
     end FUNCTION RAN2(IDUM)
     PARAMETER (M=714025,IA=1366,IC=150889,RM=1.4005112E-6)
     DIMENSION IR(97)
     DATA IFF /0/
     IF(IDUM.LT.0.OR.IFF.EQ.0)THEN
       IFF=1
       IDUM=MOD(IC-IDUM,M)
       DO 11 J=1,97
         IDUM=MOD(IA*IDUM+IC,M)
         IR(J)=IDUM
 11    CONTINUE
       IDUM=MOD(IA*IDUM+IC,M)
       IY=IDUM
     ENDIF
     J=1+(97*IY)/M
     IF(J.GT.97.OR.J.LT.1)PAUSE
     IY=IR(J)
     RAN2=IY*RM
     IDUM=MOD(IA*IDUM+IC,M)
     IR(J)=IDUM
     RETURN
     END
c
```

```
      subroutine shuffle (index, n, idum)
c
c     inputs the size of the vector and returns a random permutation
c     of the index integer numbers. Also inputs the seed.
c
      integer index(n), swap
c
      do 23 m= n,2,-1
      i = INT((m*ran2(idum))+1)
      swap = index(m)
      index(m) = index(i)
      index(i) = swap
 23   continue
      return
      end subroutine compose(p)
c
c     this constructs the p vector and returns it
c     p is made up of the weights and theta's
c
      include 'bp.ini'
c
      k=0
      do 2 h1=1,nh1
         do 2 i=1,ni
         k=k+1
 2          p(k)=w1(i,h1)
      do 3 h1=1,nh1
         k=k+1
 3       p(k) = theta1(h1)

do 4 h2=1,nh2
        do 4 h1=1,nh1
          k=k+1
 4          p(k) = w2(h1,h2)
      do 5 h2=1,nh2
         k=k+1
 5       p(k) = theta2(h2)

do 6 o=1,no
        do 6 h2=1,nh2
           k=k+1
 6          p(k) = w3(h2,o)
      do 7 o=1,no
         k=k+1
 7       p(k) = theta3(o)
c     write(6,*) k,'k after compose'
      return
      end subroutine decomp(p)
c
c     this takes the p vector apart and reconstructs the
c     weight matrixes
c
```

```
        include 'bp.ini'
c
    k=0
    do 2 h1=1,nh1
        do 2 i=1,ni
        k=k+1
2           w1(i,h1)=p(k)
    do 3 h1=1,nh1
        k=k+1
3           theta1(h1) =p(k)
    do 4 h2=1,nh2
        do 4 h1=1,nh1
        k=k+1
4           w2(h1,h2)= p(k)
    do 5 h2=1,nh2
        k=k+1
5           theta2(h2)= p(k)

do 6 o=1,no
        do 6 h2=1,nh2
        k=k+1
6           w3(h2,o)=p(k)
    do 7 o=1,no
        k=k+1
7           theta3(o) = p(k)
c   write(6,*) 'k was',k,' in decomp'
    return
    end
```

What is claimed is:

1. A method for recognizing human speech, comprising the steps of:

forming a series of acoustic waveforms functionally related to a concomitant set of uttered token human speech sounds;

forming a series of digital articulation representations functionally related to selected articulatory movement sets of a speaker uttering said token human speech sounds;

windowing each of said acoustic waveforms to form a time framed first digital speech signal series;

temporally aligning said digital articulation representations with said time framed first digital signal series;

inputting said speech signal series and said digital articulation representation to a neural network to form a learned relationship between said speech signal series as an input to said neural network and said digital articulation representation as an output from said neural network;

deriving selected acoustic features from each said time framed first digital speech signal;

associating said selected acoustic features with said selected articulatory movement sets to form a template parameter set that uniquely associates each one of said series of acoustic waveforms with each one of said selected articulatory movement sets;

forming from said human speech a second digital speech signal series;

inputting said second digital speech signal series to said neural network having said learned relationship for outputting a learned articulatory parameter set; and comparing each said learned articulatory parameter set with each one of said template parameter sets to select one template parameter set having the best match with said learned articulatory parameter set.

* * * * *